United States Patent
Tanaka

(10) Patent No.: US 6,647,200 B1
(45) Date of Patent: Nov. 11, 2003

(54) DIGITAL RECORDER, MONITORING SYSTEM, REMOTE MONITORING SYSTEM, MONITOR IMAGE RETRIEVAL METHOD, REMOTE IMAGE REPRODUCTION METHOD, RECORDING MEDIUM AND COMPUTER DATA SIGNAL

(75) Inventor: Mutsuo Tanaka, Tokyo (JP)

(73) Assignee: Securion 24 Co., Ltd., Tokyo (JP)

( * ) Notice: Subject to any disclaimer, the term of this patent is extended or adjusted under 35 U.S.C. 154(b) by 0 days.

(21) Appl. No.: 09/376,234

(22) Filed: Aug. 17, 1999

(30) Foreign Application Priority Data

Oct. 29, 1998 (JP) .......................... 10-307944
Oct. 29, 1998 (JP) .......................... 10-307945

(51) Int. Cl.[7] .................... H04N 5/91; H04N 5/225; H04N 7/04
(52) U.S. Cl. .................... 386/46; 386/117; 386/107
(58) Field of Search ................ 386/46, 117, 105, 386/106, 107, 1, 38, 52, 55; 348/143, 153, 159, 207.99, 222.1; 360/5; H04N 5/91, 5/225, 7/04

(56) References Cited

U.S. PATENT DOCUMENTS 4,326,221 A * 4/1982 Mallos et al.
4,511,886 A * 4/1985 Rodriguez
4,831,438 A * 5/1989 Bellman, Jr. et al.

FOREIGN PATENT DOCUMENTS

JP 07336668 A * 12/1995

* cited by examiner

*Primary Examiner*—Robert Chevalier
(74) *Attorney, Agent, or Firm*—Luce, Forward, Hamilton & Scripps LLP

(57) ABSTRACT

A process controller determines whether a frame image captured by a camera is in motion or not, and records only a motion image on a data recorder. The process controller reads out the frame image recorded on the data recorder. The process controller recognizes that an area of the frame image is specified by a user through an operating apparatus. The process controller sequentially reads out the frame image recorded on the data recorder, and retrieves the frame image which is in motion in the image area specified by the user through the operating apparatus. When the process controller retrieves the frame image which is in motion in the image area, it sequentially supplies to a display apparatus the frame image from the one which is previously recorded for a given number of frames, so as to reproduce the image on the display apparatus.

11 Claims, 23 Drawing Sheets

| TABLE NUMBER | CAMERA CODE | LEADING TIME CODE | RECORDING TIME | ALARM | ENTRY ADDRESS |
|---|---|---|---|---|---|
| 0 0 1 | 0 1 | 98/10/10 23:41:17 | 0:3:16 | NO | 1 2 3 4 |
| 0 0 2 | 0 2 | 98/10/10 23:52:38 | 0:10:04 | NO | 1 2 5 6 |
| 0 0 3 | 0 1 | 98/10/11 01:53:22 | 0:15:41 | ALARM | 1 2 8 3 |

| CAMERA CODE | STATE OF RECORDING | RECORDING STARTS: | ALARM | ENTRY ADDRESS |
|---|---|---|---|---|
| 01 | RECORDING | 98/10/11 06:24:31 | NO | 1 3 2 1 |
| 02 | WAITING | -/-/- -:- | - | - |
| 03 | WAITING | -/-/- -:- | - | - |
| 04 | RECORDING | 98/10/11 06:27:18 | NO | 1 3 4 7 |

FIG. 8A
| CAMERA CODE | STATE OF RECORDING | RECORDING STARTS: | ALARM | ENTRY ADDRESS |
|---|---|---|---|---|
| 0 1 | RECORDING | 98/10/11 06:24:31 | NO | 1 3 2 1 |
| 0 2 | WAITING | −/−/− −:− | − | − |
| 0 3 | WAITING | −/−/− −:− | − | − |
| 0 4 | RECORDING | 98/10/11 06:27:18 | NO | 1 3 4 7 |
FIG. 8B
| 0 1 | RECORDING | 98/10/11 06:24:31 | NO | 1 3 2 1 |
|---|---|---|---|---|
| 0 1 | RECORDING | 98/10/11 06:24:31 | NO | 1 3 2 1 |
FIG. 8C
| 0 2 | WAITING | −/−/− −:− | − | − |
|---|---|---|---|---|
| 0 2 | RECORDING | 98/10/11 06:42:47 | NO | 1 3 7 2 |

FIG. 8D

| 0 3 | WAITING | -/-/- -:- | - | - |

| 0 3 | WAITING | -/-/- -:- | - | - |

FIG. 8E

| 0 4 | RECORDING | 98/10/11 06:27:18 | NO | 1 3 4 7 |

| 0 4 | WAITING | -/-/- -:- | - | - |

FIG. 8F

| TABLE NUMBER | CAMERA CODE | LEADING TIME CODE | RECORDING TIME | ALARM | ENTRY ADDRESS |
|---|---|---|---|---|---|
| ⋮ | | | | | |
| 0 0 4 | 0 4 | 98/10/11 06:27 | 0:15:29 | NO | 1 3 4 7 |

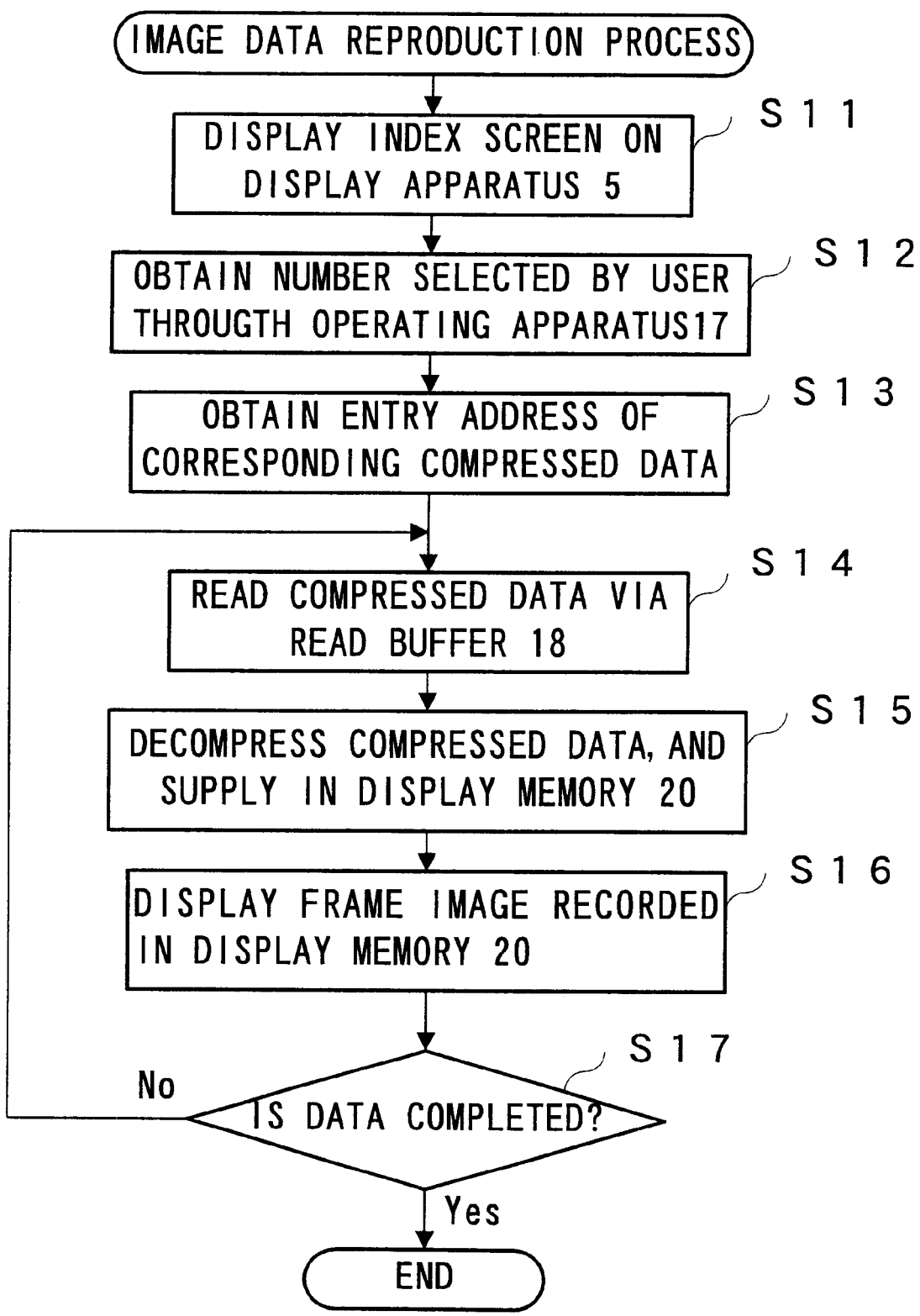

FIG. 10

| SELECTION NUMBER | CAMERA CODE | RECORDING STARTING TIME | RECORDING TIME | ALARM |
|---|---|---|---|---|
| 001 | 01 | 98/10/10 23:41 | 0:3:16 | |
| 002 | 02 | 98/10/10 23:52 | 0:10:16 | |
| 003 | 01 | 98/10/11 0:53 | 0:15:41 | * |
| 004 | 04 | 98/10/11 06:27 | 0:15:29 | |

"THERE IS NOT FOUND IMAGE IN MOTION WITHIN SPECIFIED AREA."

"CONTINUE TO RETRIEVE OTHER DATA?"

F I G. 2 0

| SELECTION NUMBER | CAMERA CODE | RECORDING STARTING TIME | RECORDING TIME | ALARM |
|---|---|---|---|---|
| 0 0 1 | 0 1 | 98/10/10 23:46 | 0:4:44 | |
| 0 0 2 | 0 2 | 98/10/10 23:55 | 0:06:21 | |
| 0 0 3 | 0 1 | 98/10/11 0:58 | 0:15:32 | * |
| 0 0 4 | 0 4 | 98/10/11 06:23 | 0:10:18 | |

DIGITAL RECORDER, MONITORING SYSTEM, REMOTE MONITORING SYSTEM, MONITOR IMAGE RETRIEVAL METHOD, REMOTE IMAGE REPRODUCTION METHOD, RECORDING MEDIUM AND COMPUTER DATA SIGNAL

BACKGROUND OF THE INVENTION

1. Field of the Invention

The present invention relates to a digital recorder, monitoring system, remote monitoring system, monitor image retrieval method, remote image reproduction method, recording medium and computer data signal, for accurately retrieving a desired image which is recorded on a magnetic disk or the like and which is captured by a monitoring camera.

2. Description of the Related Art

A monitoring system is widely known as a system which records an image captured by a monitoring camera. The monitoring system which allows surveillance of such remote images is utilized in a financial institution, for example, a bank branch, or in a store, for example, a convenience store. The monitoring camera which is arranged in a given position of the store captures an image. The monitoring system then allows the captured image to be displayed on a monitoring monitor and concurrently recorded. The recorded image is a useful evidence matter in a case of a criminal investigation and is useful for the sake of security.

The monitoring system uses a time lapse video tape recorder capable of recording an image including several frames per second. The monitoring system makes a thinned version of the image captured by the monitoring camera, and thus runs for a long period of time. The monitoring system can always record the image in chronological order, however, it takes much time to retrieve a desired image from the time lapse video tape. The thinned version of the image is recorded after it is made from the format of thirty frames/sec to two frames/sec. In such a case, there is arose various problems such that a to-be-captured-object in motion at high speeds is not accurately recognized when the image is reproduced.

The recent monitoring system is capable of detecting an undesired event based on the motion of the image (any changes in the image) which the monitoring camera captures. The monitoring system starts storing the image contemporaneous with the detection. The monitoring system compares back and forth the captured image with reference to preceding/following image in chronological order so as to determine whether the image is in motion or not (the presence of motion in the image). In a case where the monitoring system determines that the image is in motion, the monitoring system stores the captured image on the time lapse video tape recorder. Accordingly, the monitoring system which stores merely the motion image(s) can record the image captured by the monitoring camera as it is, or can record the thinned version of the image to be recorded for a long period of time.

Recently, more particularly, a monitoring system which compresses an image and store the image on a magnet disk is widely known, instead of the system recording the image on the video tape. In such a monitoring system, the magnet disk is randomly accessed in that the image can be reproduced even while still recording the image. In other words, the recorded image can be reproduced without pausing the recording.

In the monitoring system arranged inside and/or outside of the store, a plurality of monitoring cameras are generally arranged so that each of the cameras captures an image. The monitoring system determines whether there is motion in the image captured by the cameras, and if there is any, the motion image is recorded on the magnetic disk or the like. A user can specify the date or the monitoring camera's number(s) so as to retrieve a desired image from the magnet disk recording the large number of images. While reproducing the retrieved image, the user can search a particular image (scene) to be displayed.

However, in a case where the user can not specify the date, he/she has to retrieve a desired image by checking the images all way through, while reproducing the large number of the images stored on the magnet disk or the like. In following this process, it is usually time consuming to retrieve the desired image, and the user may somehow miss the desired image without noticing.

A remote monitoring system which centrally monitors a plurality of stores or institutions is also well known. Such a remote monitoring system in a time sharing manner transmits an image captured by the monitoring camera arranged inside and/or outside of the stores or institutions to the central monitoring center via an ISDN (Integrated Services Digital Network). The remote monitoring system monitors in the monitoring center the image captured inside and/or outside of the stores or institutions, and concurrently records the image on the time lapse video tape recorder.

The conventional remote monitoring system transmits all those image data captured by the monitoring camera to the central monitoring center. However, a recent remote monitoring system begins to transmit the image to the central monitoring center, as soon as an undesired event or a change is detected in the captured image. This type of remote monitoring system compares the images back and forth captured in chronological order so as to determine whether the image is in motion or not. If the remote monitoring system determines that the image is in motion, it transmits the captured image to the central monitoring center via the ISDN. According to this system, the amount of communication data and the time takes for data communication can be reduced, therefore, there is required merely a smaller number of communication circuits for monitoring a plurality of stores or institutions, resulting in the communication cost to be reduced.

However, though the recent remote monitoring system is employed, a large number of communication circuits are required for receiving the image data transmitted from all of those stores or institutions. This is because that the image data from all of the stores is transmitted to the central monitoring center at the same moment, since the customers of all over the places particularly tend to go to stores or institutions at the same time a day.

The remote monitoring system temporarily records the image data transmitted from the stores or institutions on the video tape recorder, such as a time lapse video tape recorder or the like. Except for some cases of event, accident or emergency, generally, the video tape is stored only for a week or so and is reused afterwards.

Thus, the remote monitoring system performs unnecessary tasks, since it transmits the images to the central monitoring center via the communication circuit even no undesired event occurs.

SUMMARY OF THE INVENTION

The present invention has been made in consideration of the above and an object thereof is to provide a digital recorder, monitoring system, remote monitoring system, monitor image retrieval method, remote image reproduction method, recording medium and computer data signal, for accurately retrieving a desired image referring from the images which are captured by a monitoring camera and which are recorded on a magnetic disk or the like.

According to the first aspect of the present invention, there is provided a digital recorder comprising:

- an image input device which inputs a monitor image captured by a camera arranged in a predetermined position;
- a recorder which records the monitor image input by the image input device;
- a reading device which sequentially reads out the monitor image recorded on the recorder;
- an area specifying device which specifies at least an area of the monitor image which is read out by the reading device;
- a retrieving device which retrieves an image in motion in the area specified by the area specifying device, referring from the image sequentially read out by the reading device; and
- an image output device which outputs the monitor image retrieved by the retrieving device.

According to the digital recorder of the present invention, the input device inputs the monitor image which is captured by, for example, a plurality of the cameras each arranged the predetermined position. The recorder records the monitor image input from the input device. In such a case, the recorder determines whether the image is in motion or not, and selectively records only the image which is in motion. The reading device sequentially reads out the monitor image recorded on the recorder. The area specifying device specifies, for example, a rectangular area in the monitor image read out by the reading device in accordance with a user operation. In such a case, the area specifying device may specify a plurality of areas. Of the monitor images sequentially read out by the reading device, while the retrieving device determines whether the image is in motion or not in the area specified by the area specifying device, it retrieves the monitor image which is in motion. The output device outputs the monitor image retrieved by the retrieving device on an externally arranged display apparatus. Accordingly, the user can accurately retrieve a desired image referring from the images which are captured by the plurality of monitoring cameras and which are recorded on a magnetic disk or the like.

According to the digital recorder of the present invention, the area specifying device specifies a reference image within at least an area of the monitor image read out by the reading device, the retrieving device retrieves a monitor image indicating a difference, which is greater than a given set value, between values of the reference image specified by the area specifying device and the image substantially within the same area as the reference image in the monitor image which is read out by the reading device. In such a case, because the image within the area specified by the area specifying device is appropriately determined whether to be in motion or not, a desired image referring from the images recorded on the magnetic disk or the like can be properly retrieved.

According to the digital recorder of the present invention, the recorder records a frame image which is input by the image input device at predetermined timing intervals, the reading device sequentially reads out the frame image which is recorded by the recorder. The area specifying device specifies at least the area within the frame image which is read out by the reading device. The retrieving device retrieves a frame image which is in motion within the area which is specified by the area specifying device referring from frame images sequentially read out by the reading device. The image output device outputs a frame image which is previously recorded for a given number of frames referring from the frame images retrieved by the retrieving device. In such a case, the remote monitoring system of the present invention outputs the retrieved image with reference to a preceding frame image which is previously recorded on an external display apparatus. Thus, the user can appropriately retrieve the desired frame image with reference to scenes back and forth.

According to the second aspect of the present invention, there is provided a digital recorder comprising:

- a camera which captures a monitor image and which is arranged in a predetermined position;
- a data recorder which records the monitor image captured by the camera;
- a read buffer which sequentially reads out the monitor image recorded on the data recorder;
- an operating apparatus which specifies at least an area within the monitor image read out by the reading buffer;
- a process controller which retrieves a monitor image which is in motion within the area specified by the operating apparatus, referring from the monitor image sequentially read out by the read buffer; and
- a display apparatus which displays the monitor image retrieved by the process controller.

According to the digital recorder of the present invention, a plurality of cameras are arranged each in a predetermined position and capture a monitor image. The data recorder records the monitor image captured by the camera. In such a case, the data recorder determines whether the image is in motion or not and records the only image which is in motion. The read buffer sequentially reads out the monitor image recorded on the data recorder. The operating apparatus specifies, for example, a rectangular area within the monitor image read out by the read buffer, in accordance with a user operation. In such a case, the operating apparatus may specify a plurality of areas. The process controller determines whether the image is in motion or not within the area specified by the operating apparatus referring from the monitor images read out by the read buffer, and concurrently retrieves the monitor image which is in motion. The display apparatus displays the monitor image which is retrieved by the process controller. As a result, the remote monitoring system of the present invention can appropriately retrieve the desired image referring from the images which are captured by the plurality of monitoring cameras and which are recorded on the magnetic disk or the like.

According to the third aspect of the present invention, there is provided a monitoring system comprising:

- a recorder which records a monitor image captured by a camera which is arranged in a predetermined position;
- a reading device which sequentially reads out the monitor image recorded on the recorder;
- an area specifying device which specifies an area within the monitor image read out by the reading device;
- a retrieving device which retrieves a monitor image which is in motion within the area specified by the area specifying device, referring from the monitor image sequentially read out by the reading device; and a reproducing device which reproduces the monitor image retrieved by the retrieving device.

According to the monitoring system of the present invention, the recorder records the monitor image captured by, for example, a plurality of cameras each arranged in a predetermined position. The recorder determines whether the image is in motion or not, and records only the image which is in motion. The reading device may sequentially read out the monitor image recorded on the recorder. The area specifying device specifies, for example, a rectangular area within the monitor image read out by the reading device, in accordance with a user operation. In such a case, the area specifying device may specify a plurality of areas. The retrieving device determines whether the image is in motion or not within the area specified by the area specifying device referring from the monitor image sequentially read out by the reading device, and concurrently retrieves the monitor image which is in motion. The reproducing device reproduces the monitor image retrieved by the retrieving device on a display apparatus or the like. As a result, the monitoring system of the present invention can appropriately retrieve the desired image referring from the images which are captured by the plurality of monitoring cameras and which are recorded on the magnetic disk or the like.

According to the monitoring system of the present invention, the area specifying device may specify a reference image in the area of the monitor image read out by the reading device. The retrieving device retrieves a monitor image indicating a difference, which is greater than a given set value, between values of the reference image specified by the area specifying device and the image substantially within the same area as the reference image in the monitor image which is read out by the reading device. In such a case, the monitoring system of the present invention determines whether the image is in motion or not in the area which is specified by the area specifying device. As a result, the monitoring system can appropriately retrieve the desired image from the magnetic disk or the like recording the image.

According to the monitoring system of the present invention, the recorder may record the frame image captured at predetermined intervals by the camera arranged in the predetermined position. The reading device may sequentially read out the frame image recorded on the recorder. The area specifying device may specify at least one area of the frame image read out by the reading device. The retrieving device may retrieve the frame image which is in motion within the image of the area specified by the area specifying device, referring from the frame image sequentially read out by the reading device. The reproducing device may reproduce a preceding frame image which is previously recorded for a given number of frames, referring from the frame images retrieved by the retrieving device. In such a case, the preceding image recorded prior to the retrieved image begins to be reproduced. Thus, the user can retrieve the desired image with reference to other scenes back and forth.

According to the forth aspect of the present invention, there is provided a remote monitoring system comprising:

a data recorder which records a monitor image captured by a camera arranged in a predetermined position;

a read buffer which sequentially reads out the monitor image recorded on the data recorder;

an operating apparatus which specifies at least an area of the monitor image read out by the read buffer; a process controller which retrieves a monitor image which is in motion within the area specified by the operating apparatus, referring from monitor image sequentially read out by the read buffer; and a display apparatus which displays the monitor image retrieved by the process controller.

According to the monitoring system of the present invention, the data recorder records the monitor image which is captured by, for example, a plurality of cameras each arranged in a predetermined position. The data recorder may determine whether the image is in motion or not and may record only the image in motion. The read buffer sequentially reads out the monitor image recorded on the data recorder. The operating apparatus specifies, for example, a rectangular area within the monitor image read out by the read buffer, in accordance with a user operation. In such a case, the operating apparatus may specify a plurality of areas. The process controller may determine whether there is an image which is in motion or not in the area specified by the operating apparatus in the read buffer sequentially reading out the monitor image, and may retrieve the monitor image in motion. The display apparatus may display the monitor image which is retrieved by the process controller. Accordingly, the monitoring system of the present invention may appropriately retrieve a desired image referring from the images which are captured by the plurality of monitoring cameras and which are recorded on a magnetic disk or the like.

According to the fifth aspect of the present invention, there is provided a remote monitoring system wherein a plurality of monitoring devices each obtaining a monitor image and a remote control device obtaining the monitor image from the monitoring devices are connected with each other via a network, the remote monitoring system comprising:

a recorder which records in the respective monitoring devices the monitor image which is captured by a camera arranged in a predetermined position;

a reading device which sequentially reads out in the respective monitoring devices the monitor image recorded on the recorder;

an image information transmitter which transmits in the respective monitoring devices the monitor image sequentially read out by the reading device to the remote control device via the network;

an image information receiver which receives in the remote control device the monitor image transmitted from the image information transmitter via the network; and a reproduction device which reproduces in the remote control device the monitor image received by the image information receiver.

According to the remote monitoring system of the present invention, the recorder records in the respective monitoring devices the monitor image which is captured by, for example, a plurality of cameras each arranged in a predetermined position. The recorder determines whether the image is in motion or not and records only the image which is in motion. The reading device may sequentially read out in the respective monitoring devices the monitor image recorded on the recorder. The image information transmitter transmits in the respective monitoring devices the monitor image sequentially read out by the reading device to the remote control device via the network, such as a telephone circuit or the like. The image information receiver receives in the remote control device the monitor image transmitted from the image information transmitter via the network. The reproduction device in the remote control device reproduces the monitor image received by the image information receiver on a display apparatus. Thus, the remote monitoring system of the present invention can obtain a desired image from the respective monitoring devices which are all connected to the remote control device via the network.

According to the sixth aspect of the present invention, there is provided a remote monitoring system wherein a plurality of monitoring devices each obtaining a monitor image and a remote control device obtaining the monitor image from the respective monitoring devices are connected with each other via a network, the remote monitoring system comprising:

a recorder which records in the respective monitoring devices the monitor image captured by a camera arranged in a predetermined position;

a request information transmitter which transmits in the remote control device a request for transmitting the monitor image recorded on the recorder;

a request information receiver which receives in the respective monitoring devices the monitor image transmitted from the request information transmitter;

a reading device which sequentially reads out in the respective monitoring devices the monitor image recorded on the recorder in accordance with the request information received by the request information receiver;

an image information transmitter which transmits in the respective monitoring devices the monitor image which is sequentially read out by the reading device to the remote control device;

an image information receiver which receives in the remote control device the monitor image transmitted from the image information receiver; and a reproduction device which reproduces in the remote control device the monitor image received by the image information receiver.

According to the remote monitoring system of the present invention, the recorder records in the respective monitoring devices the monitor image captured by, for example, a plurality of cameras each arranged in a predetermined position. The recorder determines whether the image is in motion or not, and records only the image which is in motion. The request information transmitter transmits in the remote control device the request information for transmitting the monitor image recorded on the recorder to the respective monitoring devices via the network. The request information receiver may receive in the respective monitoring devices the request information transmitted from the request information transmitter via the network. The reading device sequentially reads out in the respective monitoring devices the monitor image recorded on the recorder in accordance with the request information received by the request information receiver. The image information transmitter may transmit in the respective monitoring devices the monitor image sequentially read out by the reading device to the remote control device via the network. The image information receiver may receive in the remote control device the monitor image transmitted from the image information transmitter via the network. The reproduction device reproduces in the remote control device the monitor image received by the image information receiver on a display apparatus. Accordingly, the remote monitoring system of the present invention can obtain a desired image from the respective monitoring devices which are connected to the remote control device via the network.

In the remote monitoring system of the present invention, the recorder may record compressed image information wherein the monitor image which is captured by the camera arranged in the predetermined position is compressed by means of a predetermined compression technique. The reading device may sequentially read out the compressed image information recorded on the recorder. The image information transmitter transmits the compressed image information sequentially read out by the reading device to the remote control device. The image information receiver receives the compressed image information transmitted from the image information transmitter. The reproduction device may decompress the compressed image information received by the image information receiver, by means of a predetermined compression technique so as to reproduce the decompressed monitor image. In such a case, the remote monitoring system may transmit the compressed image information. Thus, an amount of communication data can be reduced, and a desired image can be obtained at speed from the monitoring devices which is connected via the network.

According to the seventh aspect of the present invention, there is provided a remote monitoring system wherein a plurality of monitoring devices each obtaining a monitor image and a remote control device obtaining the monitor image from the respective monitoring devices are connected with each other via a network, the remote monitoring system comprising:

a data recorder which records in the respective monitoring devices the monitor image which is captured by a camera arranged in a predetermined position;

a read buffer which sequentially reads out in the monitoring devices the monitor image recorded on the data recorder;

a communication device which transmits in the monitoring devices the monitor image sequentially read out by the read buffer to the remote control device via the network;

an image receiver which receives in the remote control device the monitor image transmitted from the communication device via the network; and a display apparatus which displays in the remote control device the monitor image received by the image receiver.

According to the remote monitoring system of the present invention, the data recorder in the respective monitoring devices may record the monitor image captured by, for example, a plurality of cameras each arranged in a predetermined position. The data recorder may determine whether the image is in motion or not, and may record only the image in motion. The read buffer may sequentially read out in the respective monitoring devices the monitor image recorded on the data recorder. The communication device may transmit in the respective monitoring devices the monitor image sequentially read out by the read buffer to the remote control device via the network, such as a telephone circuit or the like. The image receiver may receive in the remote control device the monitor image transmitted from the communication device via the network. The display apparatus may display in the remote control device the monitor image received by the image receiver. Thus, the remote monitoring system can obtain a desired image from the respective monitoring devices all of which are connected via the network.

According to the eighth aspect of the present invention, there is provided a monitor image retrieval method comprising:

a recording step of recording a monitor image captured by a camera arranged in a predetermined position;

a reading step of sequentially reading out the monitor image recorded in the recording step;

an area specifying step of specifying at least an area of the monitor image read out in the reading step;

a retrieving step of retrieving a monitor image which is in motion in the area specified in the area specifying step, referring from the monitor image sequentially read out by the reading step; and a reproducing step of reproducing the monitor image retrieved in the retrieving step.

According to the monitor image retrieval method, the recording step records the monitor image which is captured by, for example, a plurality of cameras each arranged in a predetermined position. In such a case, the recording step may determine whether the monitor image is in motion or not, and may record only the image which is in motion. The reading step may sequentially read out the monitor image recorded in the recording step. The area specifying step may specify, for example, a rectangular area in the monitor image read out in the reading step in accordance with a user operation. The area specifying step may specify a plurality of areas, instead of only one area. The retrieving step may determine whether the image is in motion or not in the area specified in the area specifying step, and concurrently retrieve the monitor image which is in motion, referring from the monitor image sequentially read out by the reading step. The reproducing step may reproduce the monitor image retrieved in the retrieving step on a display apparatus or the like. Accordingly, the user can appropriately retrieve a desired image referring from the images which are captured by the plurality of monitoring cameras and which are recorded on a magnetic disk or the like.

According to the ninth aspect of the present invention, there is provided a remote image reproduction method of reproducing a monitor image obtained by a plurality of monitoring devices, in a remote control device connected via a network, the remote image reproduction method comprising:

a recording step of recording in the respective monitoring devices a monitor image captured by a camera arranged in a predetermined position; a reading step of sequentially reading out in the respective monitoring devices the monitor image recorded in the recording step;

an image information transmitting step of transmitting in the respective monitoring devices the monitor image sequentially read out in the reading step to the remote control device via the network;

an image information receiving step of receiving in the remote control device the monitor image transmitted in the image information transmitting step via the network; and a reproducing step of reproducing in the remote control device the monitor image received in the image information receiving step.

According to the remote image reproduction method, the recording step may record in the respective monitoring devices the monitor image captured by, for example, a plurality of cameras each arranged in a predetermined position. The recording step may determine whether the image is in motion or not and may record only the image which is in motion. The reading step may sequentially read out in the monitoring devices the monitor image recorded in the recording step. The image information transmitting step may transmit in the respective monitoring devices the monitor image sequentially read out in the reading step to the remote control device via the network. The image information receiving step may receive in the remote control device the monitor image transmitted in the image information transmitting step via the network. The reproducing step may reproduce in the remote control device the monitor image received in the image information receiving step on a display apparatus or the like. Thus, the user can obtain a desired image from the respective monitoring devices connected via the network.

According to the tenth aspect of the present invention, there is provided a remote image reproduction method of reproducing a monitor image obtained by a plurality of monitoring devices, in a remote control device connected via a network, the remote image reproduction method comprising:

a recording step of recording in the respective monitoring devices the monitor image captured by a camera arranged in a predetermined position;

a request information transmitting step of transmitting in the remote control device request information for transmitting the monitor image which is recorded in the recording step;

a request information receiving step of receiving in the respective monitoring devices the monitor image transmitted in the request information transmitting step;

a reading step of sequentially reading out in the respective monitoring devices the monitor image which is recorded in the recording step in accordance with the request information received in the request information receiving step;

an image information transmitting step of transmitting in the respective monitoring devices the monitor image, which is sequentially read out in the reading step, to the remote control device;

an image information receiving step of receiving in the remote control device the monitor image transmitted in the image information transmitting step; and a reproducing step of reproducing in the remote control device the monitor image received in the image information receiving step.

According to the remote image reproduction method, the recording step may record in the respective monitoring devices the monitor image captured by, for example, a plurality of cameras each arranged in a predetermined position. The recording step may determine whether the image is in motion or not, and may record only the motion image. The request information transmitting step may transmit in the remote control device request information for transmitting the monitor image recorded in the recording step to the monitoring devices via the network. The request information receiving step may receive in the respective monitoring devices the monitor image transmitted in the request information transmitting step via the network. The reading step may sequentially read out in the respective monitoring devices the monitor image recorded in the recording step in accordance with the request information received in the request information receiving step. The image information transmitting step may transmit in the respective monitoring devices the monitor image sequentially read out in the reading step to the remote control device via the network. The image information receiving step may receive in the remote control device the monitor image transmitted in the image information transmitting step via the network. The reproducing step may reproduce in the remote control device the monitor image received in the image information receiving step on a display apparatus or the like. Thus, a desired image can be obtained from the respective monitoring devices which are connected to the remote control device via the network.

According to the eleventh aspect of the present invention, there is provided a recording medium which is a computer readable recording medium recording a program for executing a computer as a monitoring system, the computer readable recording medium recording the program for executing:

- a recording step of recording a monitor image captured by a camera arranged in a predetermined position;
- a reading step of reading the monitor image recorded in the recording step;
- an area specifying step of specifying at least an area of the monitor image recorded in the reading step;
- a retrieving step of retrieving a monitor image which is in motion within the area specified in the area specifying step, referring from the monitor images sequentially read out in the reading step; and
- a reproducing step of reproducing the monitor image retrieved in the retrieving step.

According to the twelfth aspect of the present invention, there is provided a recording medium which is a computer readable recording medium recording a program for executing a computer as a remote monitoring system which reproduces a monitor image obtained by a plurality of monitoring devices, in a remote control device which is connected to the plurality of monitoring devices via a network, the recording medium recording the program for executing:

- a recording step of recording in the monitoring devices the monitor image captured by a camera arranged in a predetermined position;
- a reading step of sequentially reading out in the monitoring devices the monitor image recorded in the recording step;
- an image information transmitting step of transmitting in the monitoring devices the monitor image which is sequentially read out in the reading step to the remote control device via the network;
- an image information receiving step of receiving in the remote control device the monitor image transmitted in the image information transmitting step via the network; and
- a reproducing step of reproducing in the remote control device the monitor image received in the image information receiving step.

According to the thirteenth aspect of the present invention, there is provided a computer data signal embedded in a carrier wave and representing an instruction sequence for executing a computer as a monitoring system is embedded, the computer data signal allowing the computer to execute:

- a recording step of recording a monitor image which is captured by a camera arranged in a predetermined position;
- a reading step of sequentially reading out the monitor image recorded in said recording step;
- an area specifying step of specifying at least an area within the monitor image which is read out in the reading step;
- a retrieving step of retrieving a monitor image which is in motion within the area specified in the area specifying step, referring from the monitor image sequentially read out in the reading step; and
- a reproducing step of reproducing the monitor image retrieved in said retrieving step.

According to the fourteenth aspect of the present invention, there is provided a computer data signal embedded in a carrier wave and representing an instruction sequence for executing a computer as a remote monitoring system, the computer data signal allowing the computer to execute:

- a recording step of recording in monitoring devices a monitor image captured by a camera which is arranged in a predetermined position;
- a reading step of sequentially reading out in the monitoring devices the monitor image recorded in the recording step;
- an image information transmitting step of transmitting in the monitoring devices the monitor image, as image information, sequentially read out in the reading step to a remote control device via a network;
- an image information receiving step of receiving in the remote control device the monitor image transmitted in the image information transmitting step via the network; and
- a reproducing step of reproducing the monitor image received in the image information receiving step.

BRIEF DESCRIPTION OF THE DRAWINGS

FIG. 4 is a diagram exemplifying a control table recorded in a RAM as a peripheral device of a process controller.

FIGS. 8A to 8F are diagrams each showing updated data of the control table recorded in the RAM as the peripheral device of the process controller.

FIG. 9 is a flowchart for explaining an image data reproduction process executed by the monitoring system according to the first embodiment of the present invention.

FIG. 10 is a diagram exemplifying an index screen displayed on the display apparatus.

FIG; 14B is a diagram exemplifying an image displayed on the display apparatus in a case where an image in motion is retrieved in the specified area so that an image data reproduction process is restarted.

Figure 15:
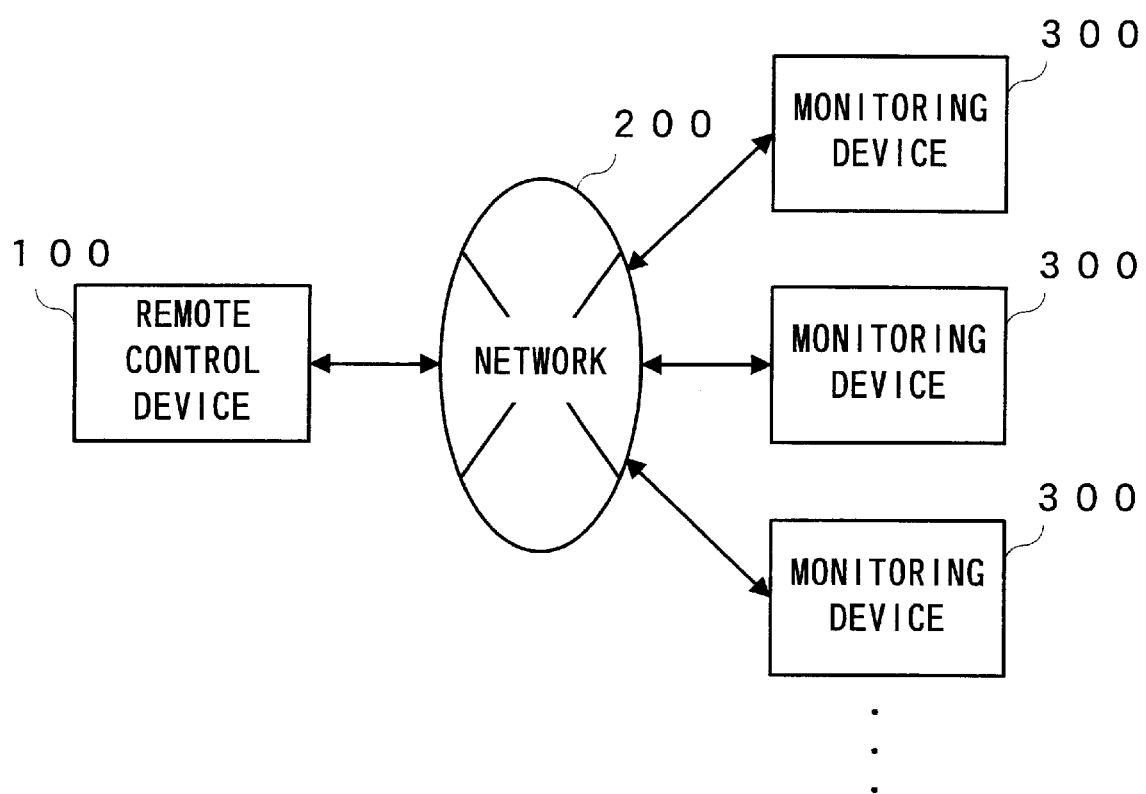

FIG. 15 is a diagram exemplifying the structure of a remote monitoring system according to the second embodiment of the present invention.

Figure 16:
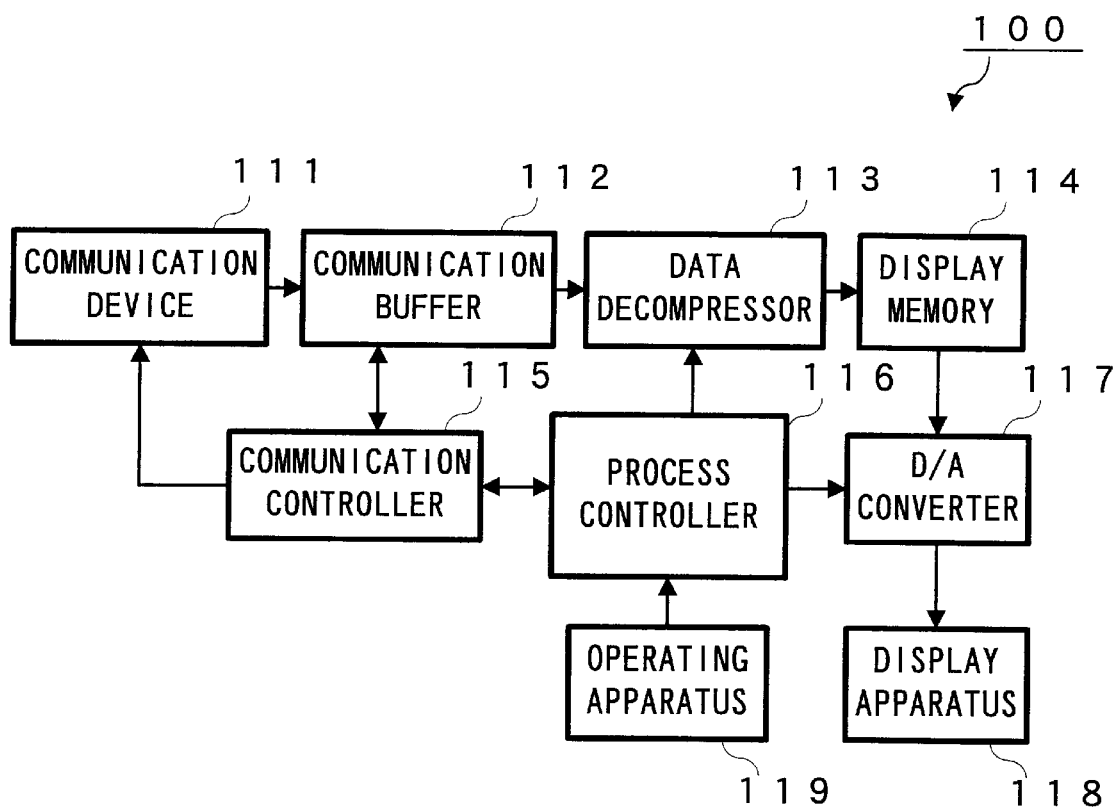

FIG. 16 is a diagram exemplifying the structure of a remote control device of the remote monitoring system according to the second embodiment of the present invention.

Figure 17:
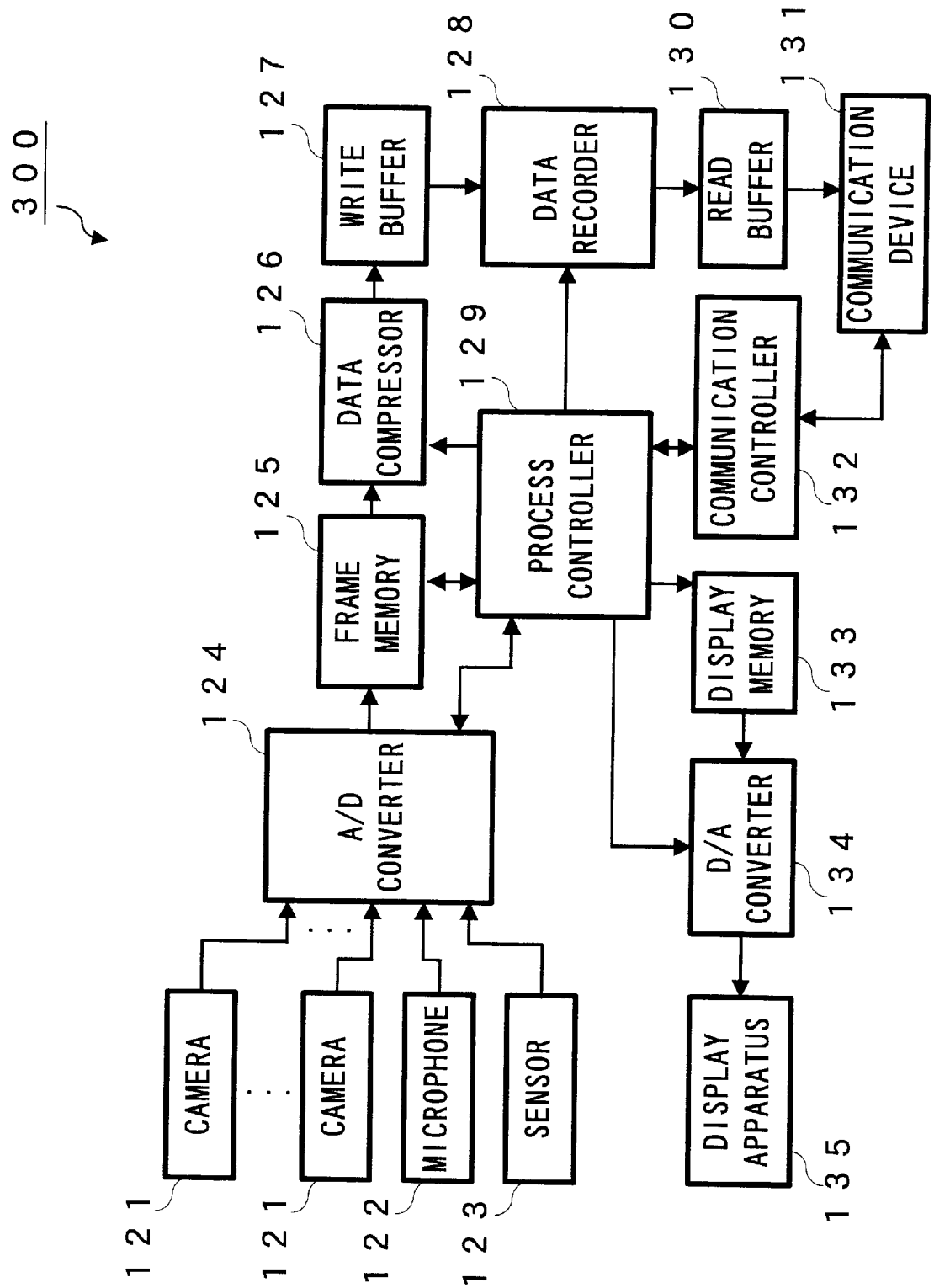

FIG. 17 is a diagram exemplifying the structure of a remote monitoring device of the monitoring system according to the second embodiment of the present invention.

Figure 18:
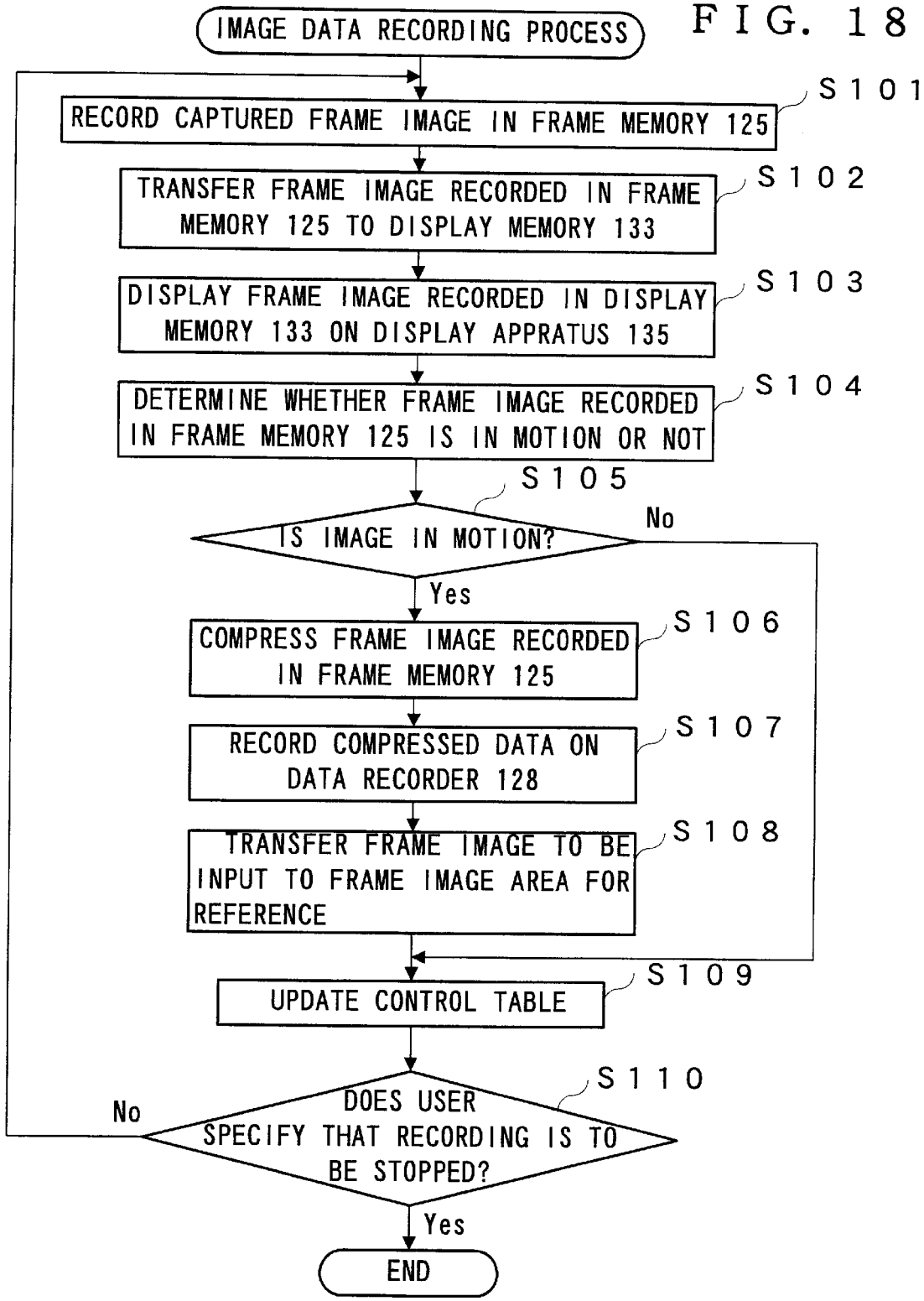

FIG. 18 is a flowchart for explaining an image data recording process executed by the monitoring device of the remote monitoring system according to the second embodiment of the present invention.

Figure 19A:
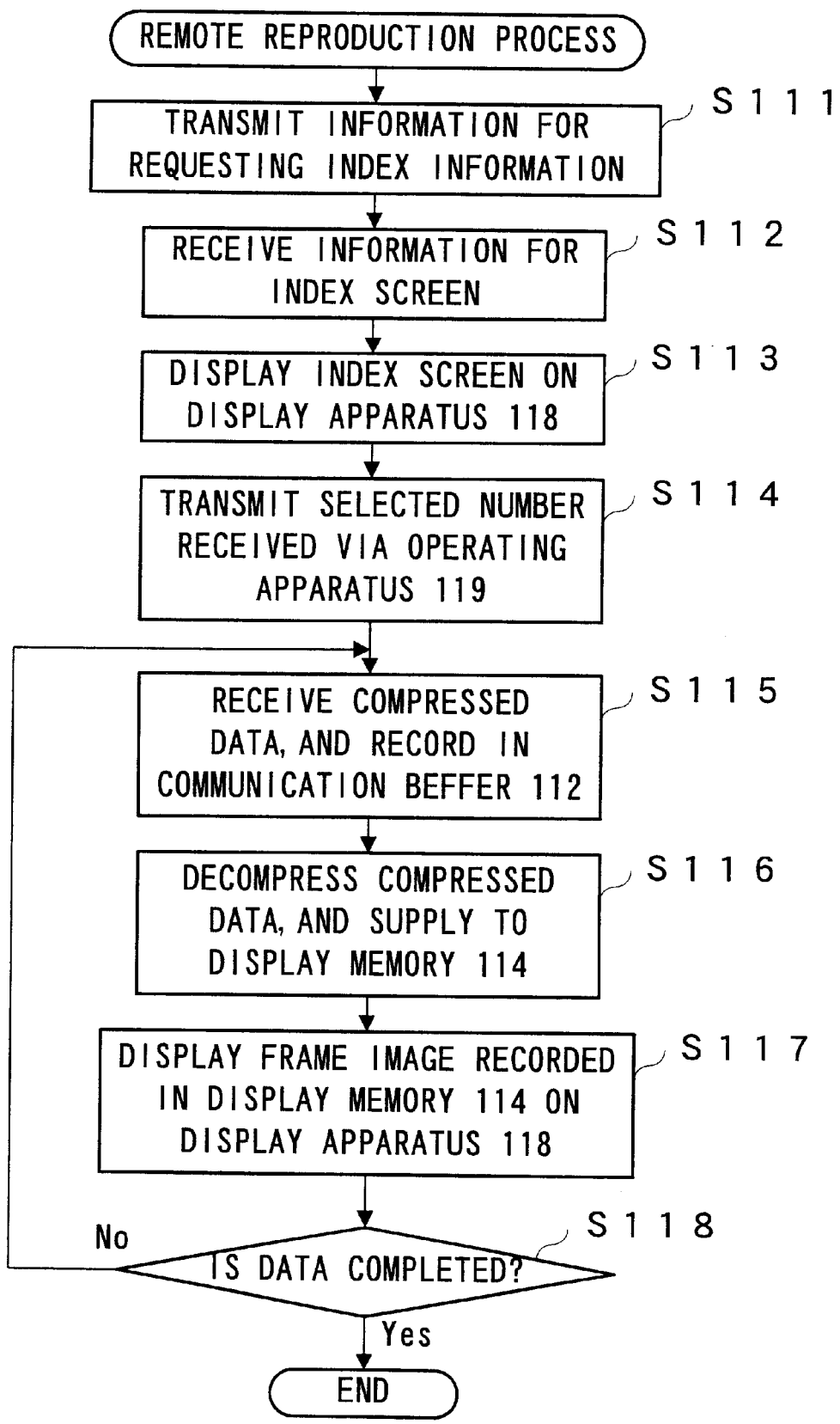

FIG. 19A is a flowchart for explaining a remote reproduction process executed by the remote control device of the remote monitoring system according to the second embodiment of the present invention.

Figure 19B:
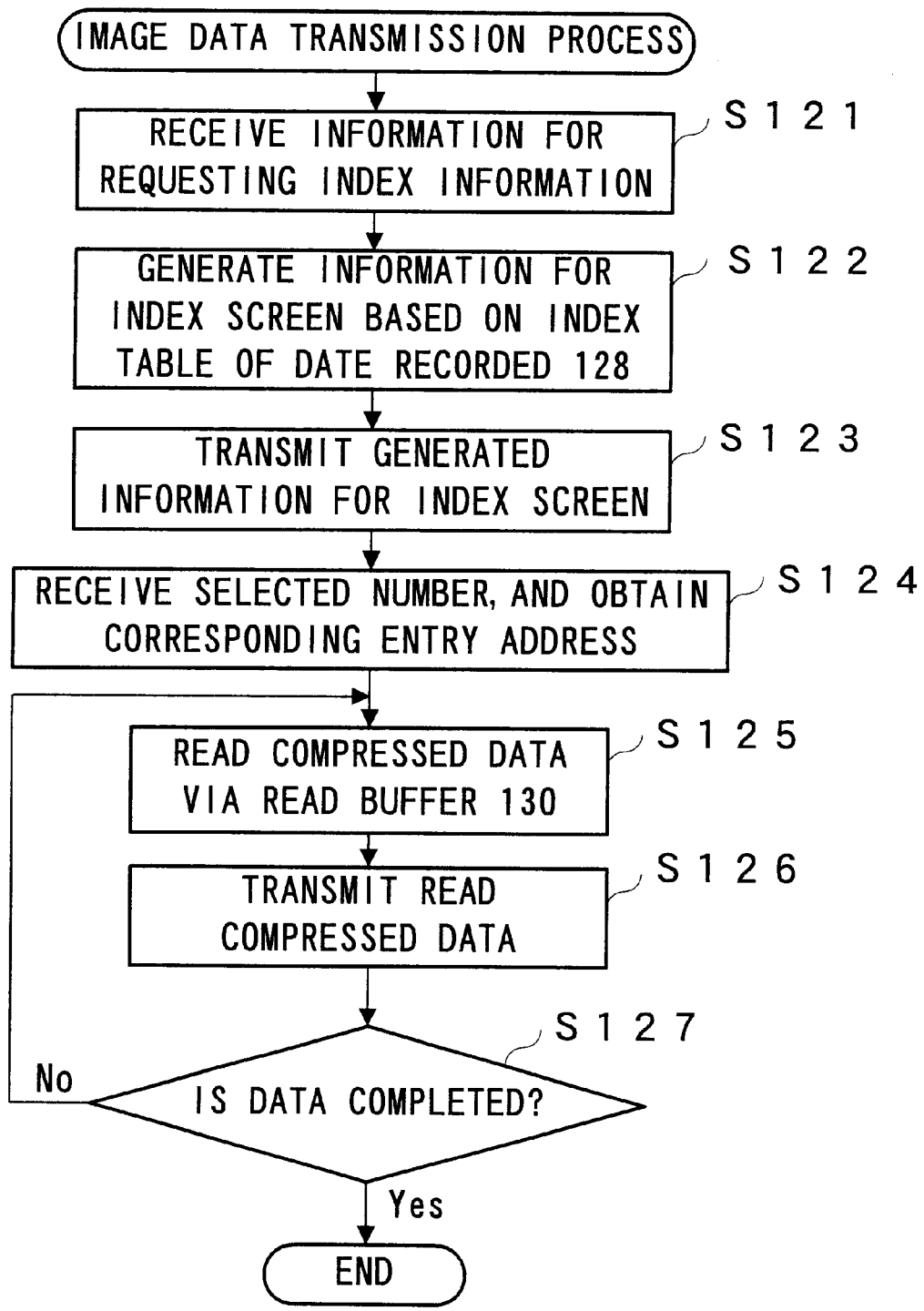

FIG. 19B is a flowchart for explaining an image data transmission process executed by the monitoring device of the remote monitoring system according to the second embodiment of the present invention.

FIG. 20 is a diagram exemplifying an index screen displayed on a display apparatus.

Figure 21:
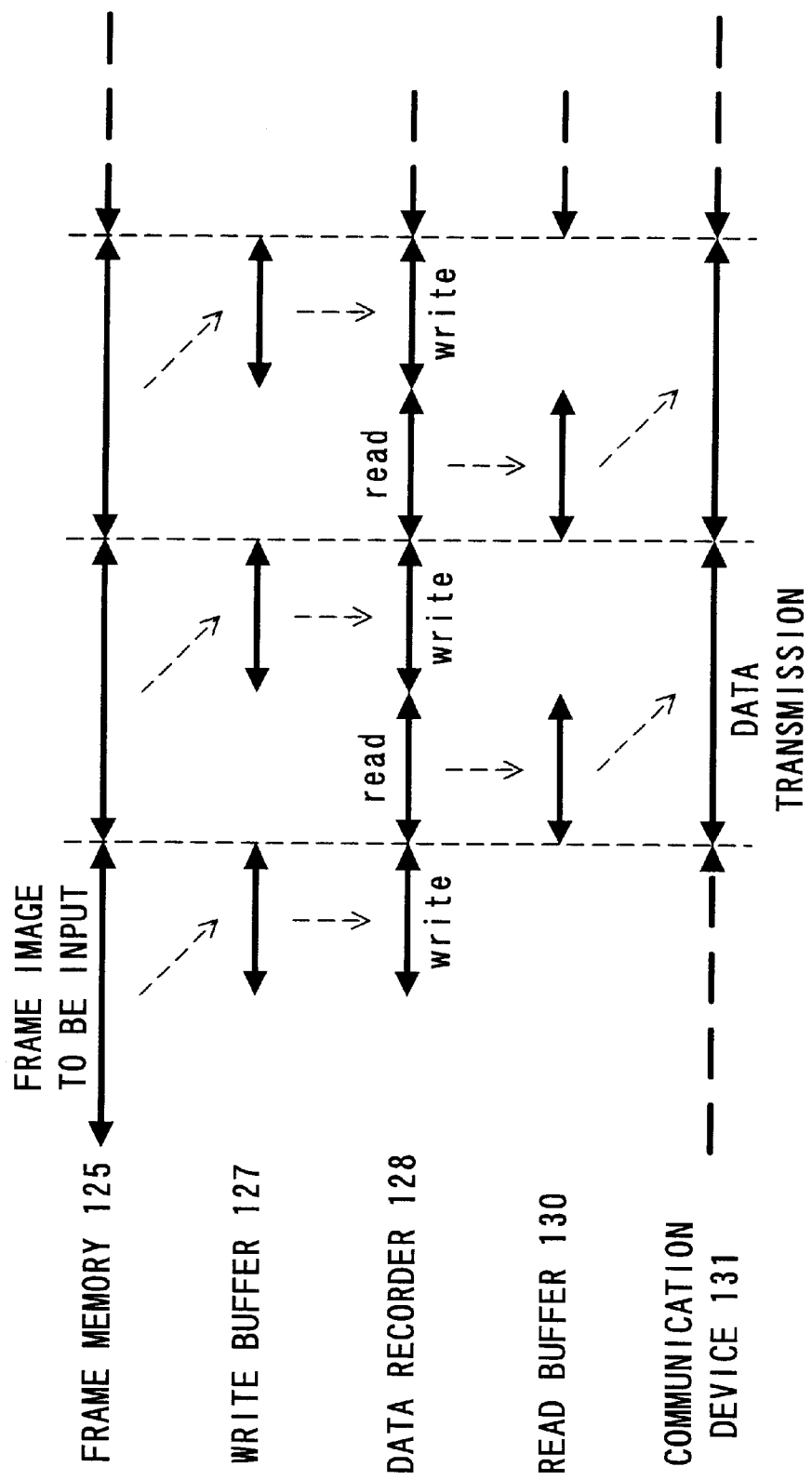

FIG. 21 is a diagram exemplifying data timings of a read and write buffers in a case of concurrent recording and reproducing executed by a data recorder.

DETAILED DESCRIPTION OF THE PREFERRED EMBODIMENTS

Embodiments of the present invention will now be explained with reference to the accompanying drawings.

Figure 1:
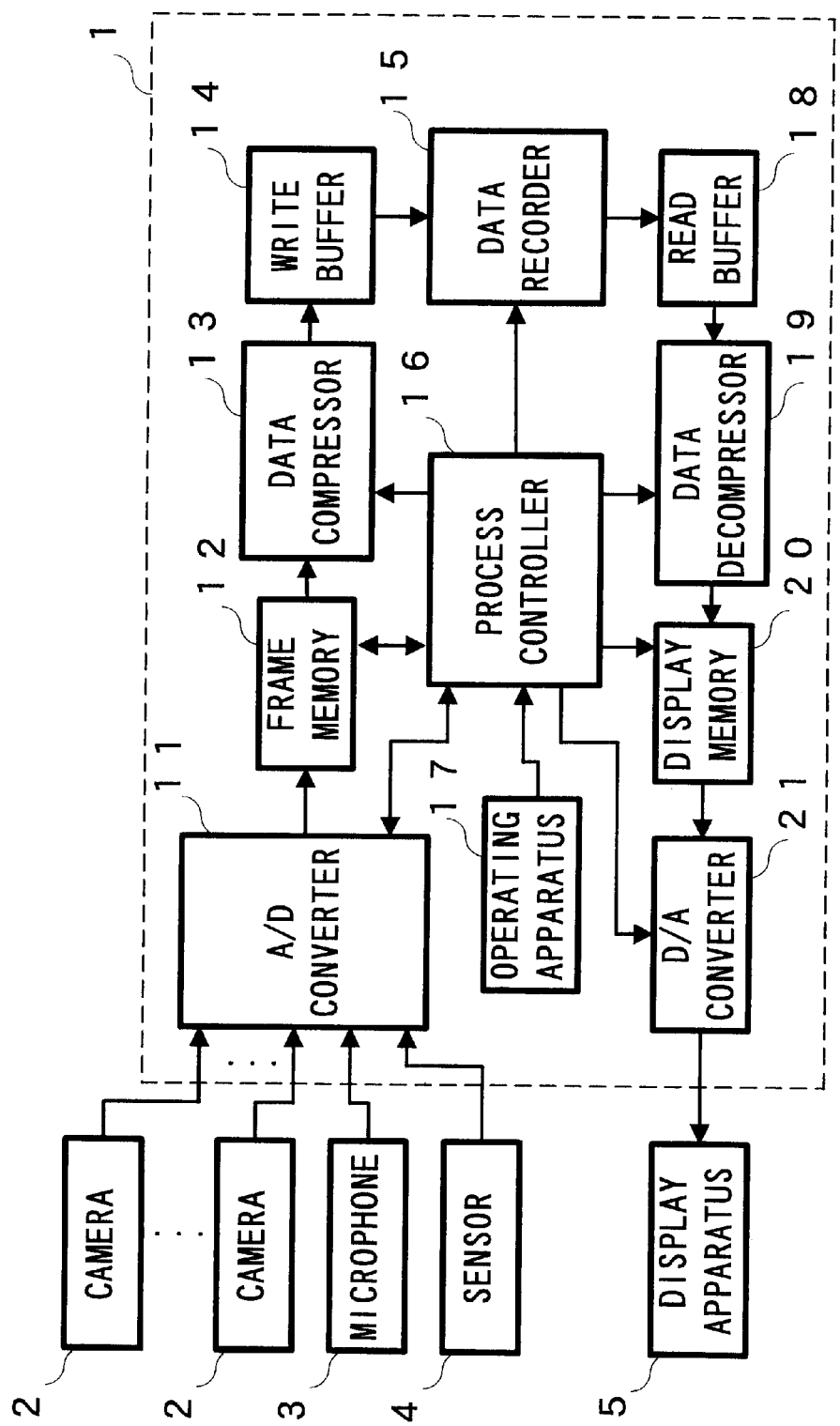
FIG. 1 is a diagram exemplifying the structure of a monitoring system according to the first embodiment of the present invention.

FIG. 1 is a diagram exemplifying the structure of a monitoring system according to the first embodiment of the present invention. As shown in FIG. 1, the monitoring system comprises a digital recorder 1, cameras 2, a microphone 3, a sensor 4 and a display apparatus 5.

The digital recorder 1 includes an AND (analog/digital) converter 11, a frame memory 12, a data compressor 13, a write buffer 14, a data recorder 15, a process controller 16, an operating apparatus 17, a read buffer 18, a data decompressor 19, a display memory 20 and a D/A (digital/analog) converter 21.

The A/D (analog/digital) converter 11 converts into a digital signal a picture signal input from the cameras 2, the microphone 3 and the sensor 4, and also various analog signals such as a voice signal. The converter 11 sequentially supplies the converted signal to the frame memory 12 and to the process controller 16.

Figure 2:
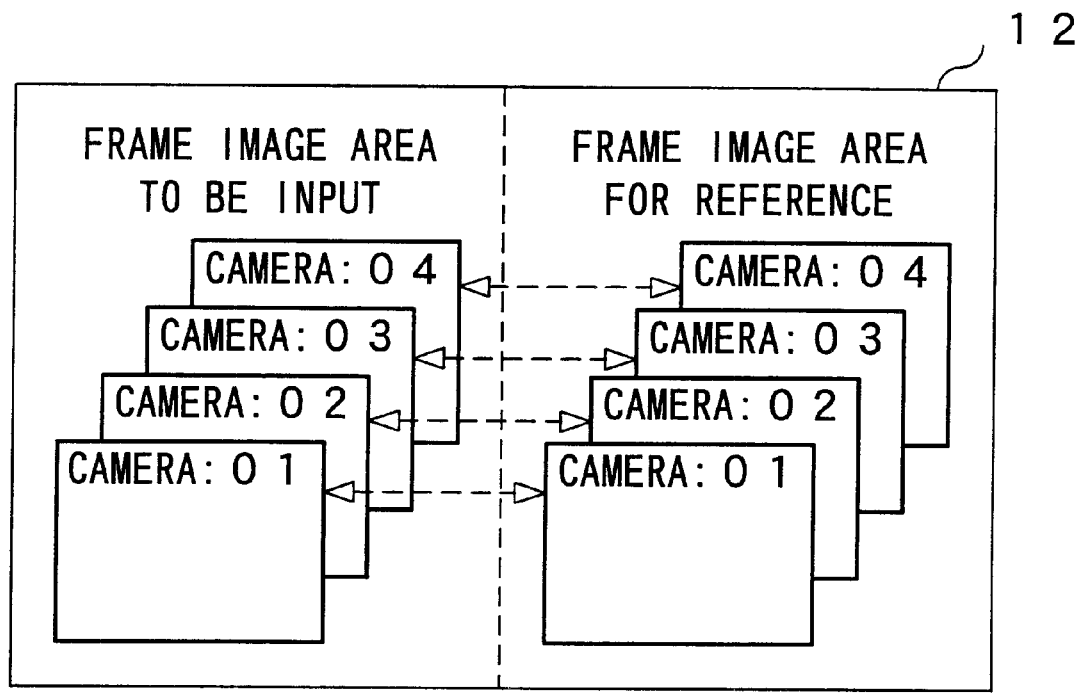
FIG. 2 is a diagram exemplifying a plurality of frame images to be input and a plurality of frame images for reference all of which are recorded in a frame memory.

The frame memory 12 temporarily records a frame image to be input which is input from one of the cameras 2 via the A/D converter 11 and a frame image for reference used for determining whether an image is in motion or not. As seen from FIG. 2, the frame memory 12 is composed of four frame image areas to be input and four frame image areas for reference, for example. The number of the frame image areas corresponds to the number of the arranged cameras. A camera code is previously given to the respective cameras 2 each of which captures a frame image to be input. In addition, in each of the frame image areas, the captured frame image to be input is recorded.

The frame memory 12 records voice data input from the microphone 3 via the A/D converter 11. The frame memory 12 at once records the voice data corresponding to a predetermined period of time so as to coincide with a timing at which the frame image to be input is obtained from one of the cameras 2 via the AND converter 11. The frame memory 12 obtains the frame image to be input via the A/D converter 11 at an interval of four frames per second, for example. In such a case, the frame memory 12 records voice data wherein a voice corresponding to one frame for a quarter second has been sampled at a predetermined interval.

Of the frame images stored in the frame memory 12, a frame image to be input which is determined as being in motion is compressed by the data compressor 13. This compression is performed by means of a predetermined compression technique, for example, a JPEG (Joint Photographic Expert Group) technique. The compressed data is then supplied to the write buffer 14. In a case where the frame image determined as being in motion is captured by a predetermined camera 2 having the camera code 01, for example, the data compressor 13 compresses voice data obtained from the microphone 3 as well as the frame image to be input. The data compressor 13 then supplies the compressed data to the write buffer 14.

The write buffer 14 temporarily records the compressed data which is supplied from the data compressor 13 and which is to be recorded on the data recorder 15.

The data recorder 15 includes a magnet disk (hard disk) having a given storage capacity and stores the compressed data or the like supplied from the data compressor 13 via the write buffer 14. The data recorder 15 supplies the compressed data stored thereon to the data decompressor 19 via the read buffer 18. The data recorder 15 allows the compressed data to be input and output via the write buffer 14 and read buffer 18. Thus, the data recorder 15 is capable of concurrently writing and reading data.

The information recorded on the data recorder 15 will now be described with reference to FIGS. 3A and 3B. The data recorder 15 records an index table shown in FIG. 3A and actual data shown in FIG. 3B.

Figures 3A, 3B:
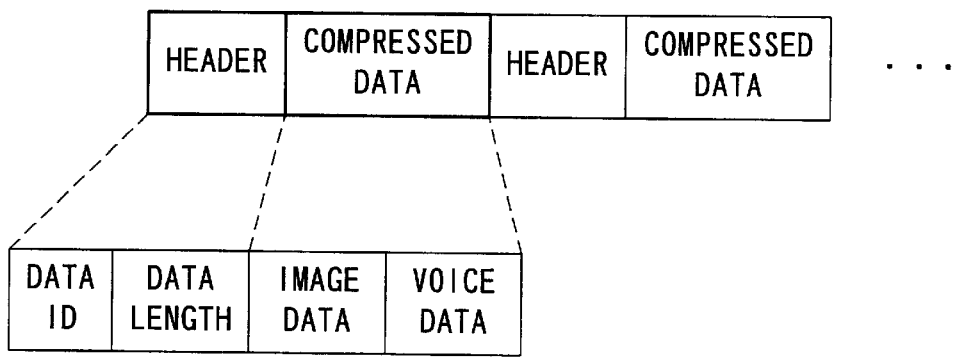
FIG. 3A is a diagram exemplifying an index table recorded on a data recorder.
FIG. 3B is a diagram exemplifying compressed data (actual data) with a header which is recorded on the data recorder.

The index table shown in FIG. 3A is a table for controlling compressed data, such as frame images which are continuously recorded on the respective cameras 2. The index table includes categories of, for example, table numbers, camera codes each applied to the respective cameras 2, lead time codes of the continuously recorded compressed data, periods of recording time at which the image is continuously recorded, whether or not an alarm signal input from the sensor 4 is raised during the recording and entry addresses of the recorded compressed data. Referring to FIG. 3A, information of the table number 003, for example, indicates that an image is recorded by the camera 2 with the camera code of 1 for fifteen minutes and forty one second since 1:53:22 am. on Oct. 11, 1998, and there was input an alarm signal from the sensor 4. Further, the entry address of the compressed data is indicated as 1283.

FIG. 3B shows both of the actual data which includes headers including a data ID and data length, and compressed data including compressed frame image data and voice data. Each of the headers in the actual data comprises a pointer for specifying an address of the continuously following compressed data. Each of the headers can also comprises a pointer for specifying an address of the continuously preceding compressed data so that an inverse reproduction can be performed.

Referring back to FIG. 1, the process controller 16 comprises a ROM (Read Only Memory), a RAM (Random Access Memory) and a CPU (Central Processing Unit) having a peripheral device of, for example, a date/time generator, and controls the entire digital recorder 1.

The process controller 16 sequentially transfers the frame images to be input which are stored in the frame memory 12 and which are transmitted from the respective cameras 2 via the A/D converter 11 to the display memory 20. The transferred frame images are supplied to the display apparatus 5 via the D/A converter 21. The process controller 16 then allows the images to be displayed as monitor images. In other words, the process controller 16 allows the image captured by the respective cameras 2 to be displayed in real time.

The process controller 16 compares the frame images to be input which are input from the cameras 2 via the A/D converter 11 and frame images for reference which are stored in the frame memory 12. The process controller 16 then determines whether the image is in motion or not. That is, the process controller 16 obtains a difference between values of the frame images to be input and the frame images for reference. The process controller 16 then determines that the image is in motion, if the obtained difference indicates a greater value than a given value. In a case where the image is in motion, the process controller 16 controls the data compressor 13 so as to compress the image data or the like. The compressed data is then recorded on the data recorder 15 via the write buffer 14. When the compressed data is recorded on the data recorder 15, the process controller 16 forms the index table shown in FIG. 3A by means of the control table, shown in FIG. 4, which is stored in the RAM as a peripheral device (not shown).

The control table illustrated in FIG. 4 comprises several categories of, such as the camera code corresponding to each one of the cameras 2, the state of either recording or waiting, the starting time indicating the starting time of recording while the recording is still in operation, indication of an alarm to be input during recording, and the entry address indicating the leading address of the continuously arranged compressed data.

In a case where the process controller 16 determines that the frame image to be input which is recorded by the camera 2 with the camera code 01 is no longer in motion, it updates the index table which is shown in FIG. 3A and which is stored on the data recorder 15 in accordance with the information of the camera code 01.

In a case where the user specifies through from the operating apparatus 17 that the compressed data, such as the frame image stored on the data recorder 15 is to be reproduced, the process controller 16 sequentially reads out the corresponding compressed data from the data recorder 15 via the read buffer 18. The process controller 16 controls the data decompressor 19 and allows the read compressed data to be decompressed. The process controller 16 supplies the decompressed frame image to the display memory 20 and to the display apparatus 5 via the D/A converter 21. In other words, the process controller 16 reproduces the corresponding compressed data stored on the data recorder 15 so as the data to be sequentially displayed on the display apparatus 5.

Furthermore, the user specifies through from the operating apparatus 17 that the image is to be retrieved. In such a case, the process controller 16 sequentially determines if the image is in motion within the specified area of the frame image decompressed by the data decompressor 19 and retrieves the motion image. That is, the process controller 16 sequentially reads out the compressed data from the data recorder 15 and controls the data decompressor 19 so as to sequentially decompress the read compressed data. The process controller 16 obtains a difference between values of a reference image for retrieval as an arbitrary image area specified by the user from the operating apparatus 17 and a corresponding area in the frame image decompressed by the data decompressor 19. The process controller 16 then sequentially retrieves an image which indicates the obtained difference whose value is greater than a given value. In a case where the image is in motion in the specified area, the process controller 16 supplies the image to the display apparatus 5 via the D/A converter 21 and restarts reproducing the image.

The operating apparatus 17 is an input device, such as a keyboard and/or a mouse. The operating apparatus 17 can be a remote controller by which the specified information input by the user is supplied to the process controller 16 using radio communications, such as infrared rays or the like.

The read buffer 18 temporarily records the compressed data, such as a frame image read out from the data recorder 15.

The data decompressor 19 decompresses the compressed data recorded in the read buffer 18 and supplies the decompressed data to the display memory 20.

The display memory 20 is composed of a display area wherein an image which is displayed on the display apparatus 5 via the D/A converter 21 is recorded and of a non-display area wherein a reference image for retrieval is recorded.

Figure 5A:
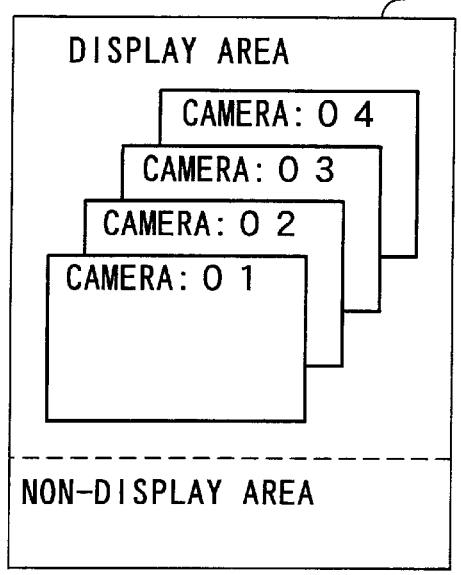
FIGS. 5A and 5B are diagrams each exemplifying a plurality of frame images stored in a display area of a display memory.

In a case where the image captured by one of the cameras 2 is displayed in real time, the display memory 20 sequentially records the four frame images to be input in the display area shown in FIG. 5A. The four frame images to be input are transferred from the frame memory 12 by the process controller 16.

In addition to the image captured by the cameras 2, the image is reproduced from the compressed data recorded on the data recorder. In such a case, as seen from FIG. 5B, the frame image to be reproduced wherein the compressed data read out from the data recorder 15 is decompressed can sequentially be recorded in the display area, instead of using the frame image to be input captured by one of the cameras 2 with the camera code 02, for example.

Figure 5B:
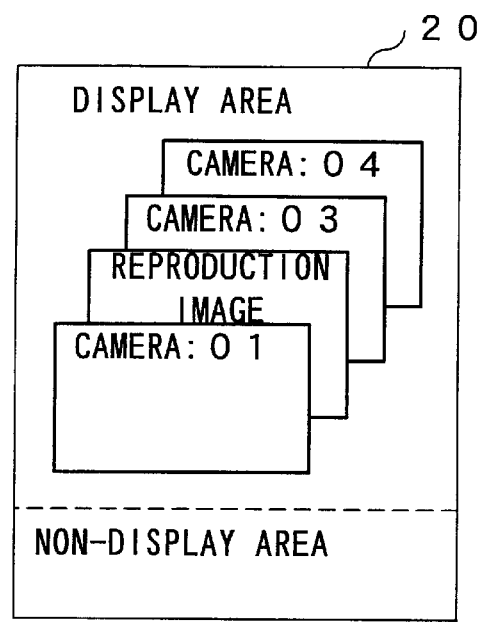
Figure 5C:
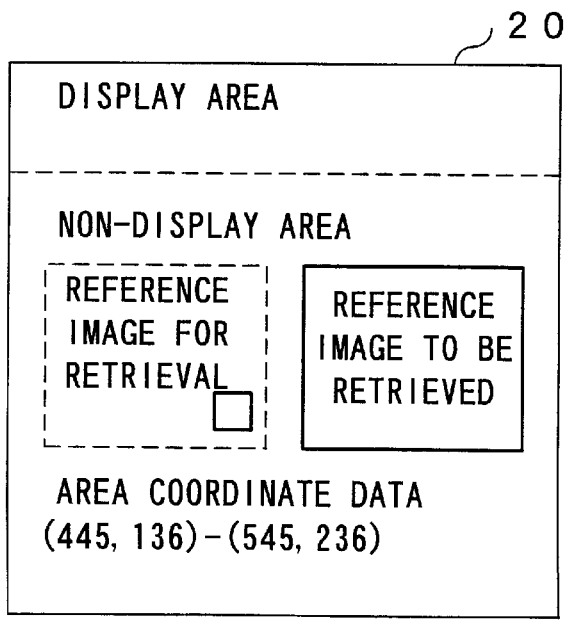
FIG. 5C is a diagram exemplifying a reference image for retrieval and an image to be retrieved both of which are stored in a non-display area of the display memory.

In case of retrieving the image, the display memory 20 records the reference image for retrieval and an image to be retrieved in its non-display area as illustrated in FIG. 5C.

The D/A (digital/analog) converter 21 converts the frame image recorded in the display area of the display memory 20 into an analog signal such as a picture signal or the like. The D/A converter 21 sequentially supplies the converted analog signal to the display apparatus 5.

The cameras 2 in this embodiment of the present invention are a plurality of imaging cameras of, for example, four CCD cameras each of which is arranged in a given position, inside and/or outside of the store or institution. Each of the cameras 2 captures an image within a predetermined range centering from the arranged position. The cameras 2 generate a picture signal so as to sequentially supply the signal to the frame memory 12 via the A/D converter 11. Of the camera codes from 01 to 04, a code is given to the respective cameras 2. The frame image captured by the respective cameras 2 each having the camera code is recorded in an either area of the frame memory 12.

The microphone 3 can be arranged at a peripheral section of one of the cameras 2, or can be incorporated with one of the cameras 2 so as to obtain voice data from their positions. The microphone 3 allows the obtained voice signal to be recorded in a predetermined area of the frame memory 12 via the A/D converter 11. It is also possible that a plurality of microphones 3 are arranged so as to obtain voice signals from all of the positions.

The sensor 4 can be a shock sensor, a infrared sensor, or a temperature sensor. When the sensor 4 detects an undesired value which exceeds a preset value, it generates an alarm signal and supplies the generated signal to the process controller 16 via the A/D converter 11.

Figure 6A:
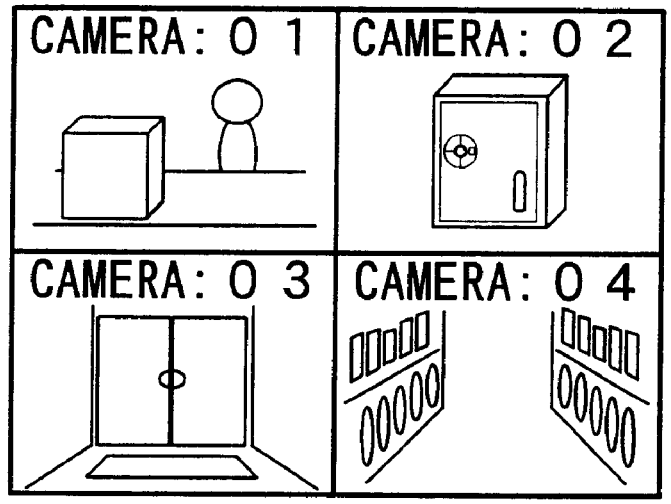
FIGS. 6A and 6B are diagrams each exemplifying a screen split into four divisions displayed on a display apparatus.
Figure 6B:
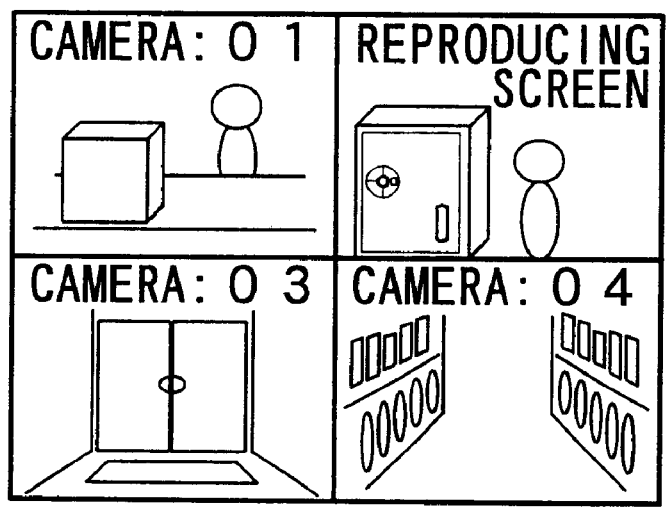

The display apparatus 5 displays the frame image or the like supplied from the display memory 20 via the D/A converter 21. The display apparatus 5 displays the image captured by the cameras 2 in real time. In such a case, the apparatus 5 sequentially displays the four frame images recorded in the display area of the display memory 20, as illustrated in FIG. 5A, on the screen split into four divisions as described in FIG. 6A. In addition to the image captured by one of the cameras 2, the image wherein the compressed data read out from the data recorder 15 is decompressed can be displayed. In such a case, the display apparatus 5 displays the image recorded in the display area of the display memory 20, as shown in FIG. 5B, onto the screen split into divisions as illustrated in FIG. 6B.

Figure 7:
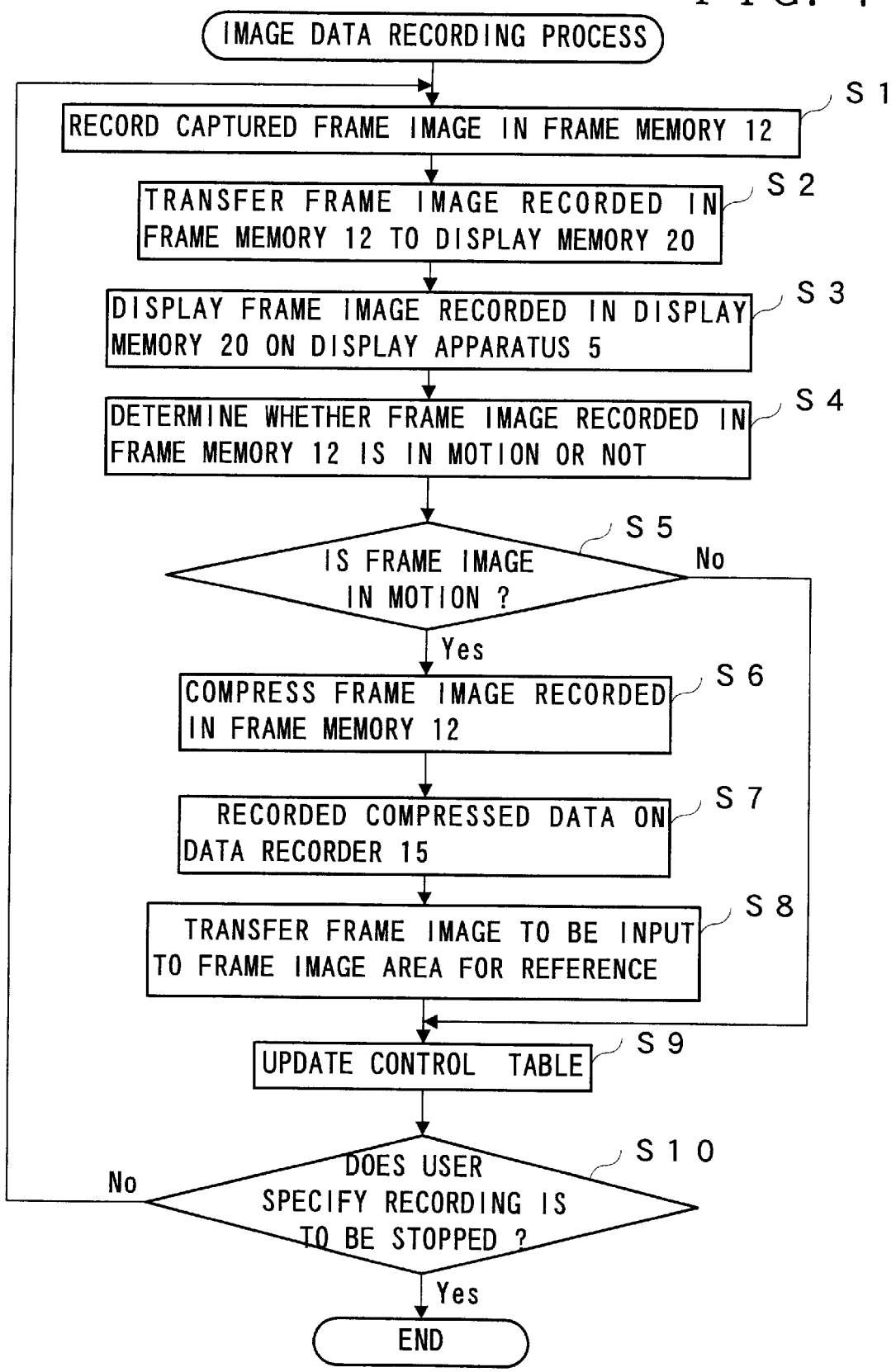
FIG. 7 is a flowchart for explaining an image data recording process executed by the monitoring system according to the first embodiment of the present invention.

An image data recording process executed by the monitoring system according to the first embodiment of the present invention will now be explained with reference to FIG. 7. FIG. 7 is a flowchart for explaining the image data recording process executed by the monitoring system of the present invention. The image data recording process begins when the user specifies recording by inputting from the operating apparatus 17.

The process controller 16 allows the frame image to be input which is supplied from the respective cameras 2 via the A/D converter 11 to be recorded in the frame memory 12 (Step S1).

The process controller 16 transfers the frame image to be input which is recorded in the frame memory 12 to the display memory 20 (Step S2).

The process controller 16 then allows the frame image to be input which is recorded in the display memory 20 to be displayed on the display apparatus 5 (Step S3). In other words, the process controller 16 allows the monitor image captured by one of the cameras 2 to be displayed on the display apparatus 5 in real time.

The process controller 16 determines whether the frame image to be input is in motion nor not which image is recorded in the frame memory 12 (Step S4). The process controller 16 obtains a difference between values of the frame image for reference and the input frame image. In a case where the obtained difference is smaller than a given value, it is recognized that the image is not in motion. On the contrary, in a case where the obtained difference is greater than the given value, it is recognized that the image is in motion.

Accordingly, the process controller 16 can determine whether the image is in motion or not (Step S5).

In a case where the process controller 16 determines that the frame image to be input is not in motion, the flow goes to step S9.

On the other hand, in a case where the process controller 16 determines that the frame image to be input is in motion, it controls the data compressor 13 so as to compress the frame image to be input (Step S6). The process controller 16 provides a header to the compressed data.

The process controller 16 allows the compressed data with the header to be recorded on the data recorder 15 via the write buffer 14 (Step S7).

The process controller 16 transfers the frame image to be input to a corresponding frame image area for reference (Step S8).

The process controller 16 updates the control table recorded in the RAM which is the peripheral device (Step S9). A process of updating the table for controlling information executed by the process controller 16 will now be explained with reference to FIGS. 8A to 8F in consideration with both cases where the process controller 16 determines that the image is in motion in Step S5, and where the process controller 16 determines that the image is not in motion in Step S5. The control table shown in FIG. 8A is one which has not been updated yet.

In Step S5, if the process controller 16 determines that the frame image of the camera code 01 which is currently in a state of recording is in motion, it maintains the contents of the control table as it is, shown in FIG. 8B. On the contrary, if the process controller 16 determines that the frame image of the camera code 02 which is currently in a state of waiting is in motion, it updates the contents of the control table as illustrated in FIG. 8C. That is, the process controller 16 updates the state in the control table from "waiting" to "recording". The process controller 16 updates the contents of the control table by setting the starting time which is obtained from date/time generator included therein.

If the process controller 16 determines that the frame image of the camera code 03 which is currently in the sate of waiting is not in motion, it maintains the contents of the control table as it is, shown in FIG. 8D. On the contrary, if the process controller 16 determines that the frame image of the camera code 04 which is currently in the state of recording is not in motion, it updates the contents of the control table as illustrated in FIG. 8E. The process controller 16 updates the contents of the control table. The process controller 16 changes the state of the cameras 2 from "recording" to "waiting", and sets a predetermined initial value to each of the boxes of the starting time for recording, the presence of alarm and the entry address. The process controller 16 adds a new table shown in FIG. 8F to the index table which is recorded on the data recorder 15.

Referring back to FIG. 7, the process controller 16 determines whether the user specifies that the recording is to be stopped by inputting through the operating apparatus 17 (Step S10). If the process controller 16 determines the user does not specify the stoppage, the flow goes back to Step S1 and the above processes are repeated. If the process controller 16 determines that the user specifies to stop the recording, the image data recording process is ended.

As explained above, in the image data recording process, the compressed data such as the frame image of the like to be compressed is recorded on the data recorder 15, if the process controller 16 determines that the frame image is in motion. In such a case, the process controller 16 controls the state of recording by updating the control table. In a case where continuous recording has been stopped, the process controller 16 forms the index table based on the control table so as to record the formed table on the data recorder 15. As a result, in the case where the continuous recording of the image data is stopped, the process controller 16 forms the index table, so that the user can immediately retrieve the already-recorded compressed data.

An image data reproduction process executed by the monitoring system according to the first embodiment of the present invention will now be explained with reference to FIG. 9. FIG. 9 is a flowchart for explaining a process of reproducing image data executed by the monitoring system of the present invention. While the process controller 16 executes the image data reproduction process shown in FIG. 9 and the image data recording process described in FIG. 7 simultaneously, the monitoring system can concurrently record and reproduce the compressed data or the like.

Once the process controller 16 recognizes that the user specifies the reproduction of the data by inputting through the operating apparatus 17, while the image data recording process described in FIG. 7 is still in operation, the process controller 16 starts the image data reproduction process described in FIG. 9 concurrently with the image data recording process.

The process controller 16 generates index screen information and makes the information to be displayed on the display apparatus 5 (Step S11). That is, the process controller 16 generates the index screen information constituting an index screen, which is shown in FIG. 10. This index screen information is generated based on the index table recorded on the data recorder 15 and is supplied in the display memory 20. In such a case, the process controller 16 stops transferring to the display memory 20 a predetermined frame image to be input, in this case the frame image of the camera code 02 for example, which is recorded in the frame memory 12. Instead, the process controller 16 supplies the generated index screen information in the display memory 20. Thus, on the display apparatus 5, the index screen described in FIG. 10 is displayed on the display apparatus in place of the image of the camera code 02 described in the form of the screen split into four divisions.

The user selects a number representing which one of the already-captured images is to be reproduced. The process controller 16 obtains this user-selected number via the operating apparatus 17 (Step S12).

The process controller 16 reads out the index table corresponding to the user-selected number from the data recorder 15. The process controller 16 then obtains an entry address of the compressed data which is set in the table (Step S13).

Figure 11:
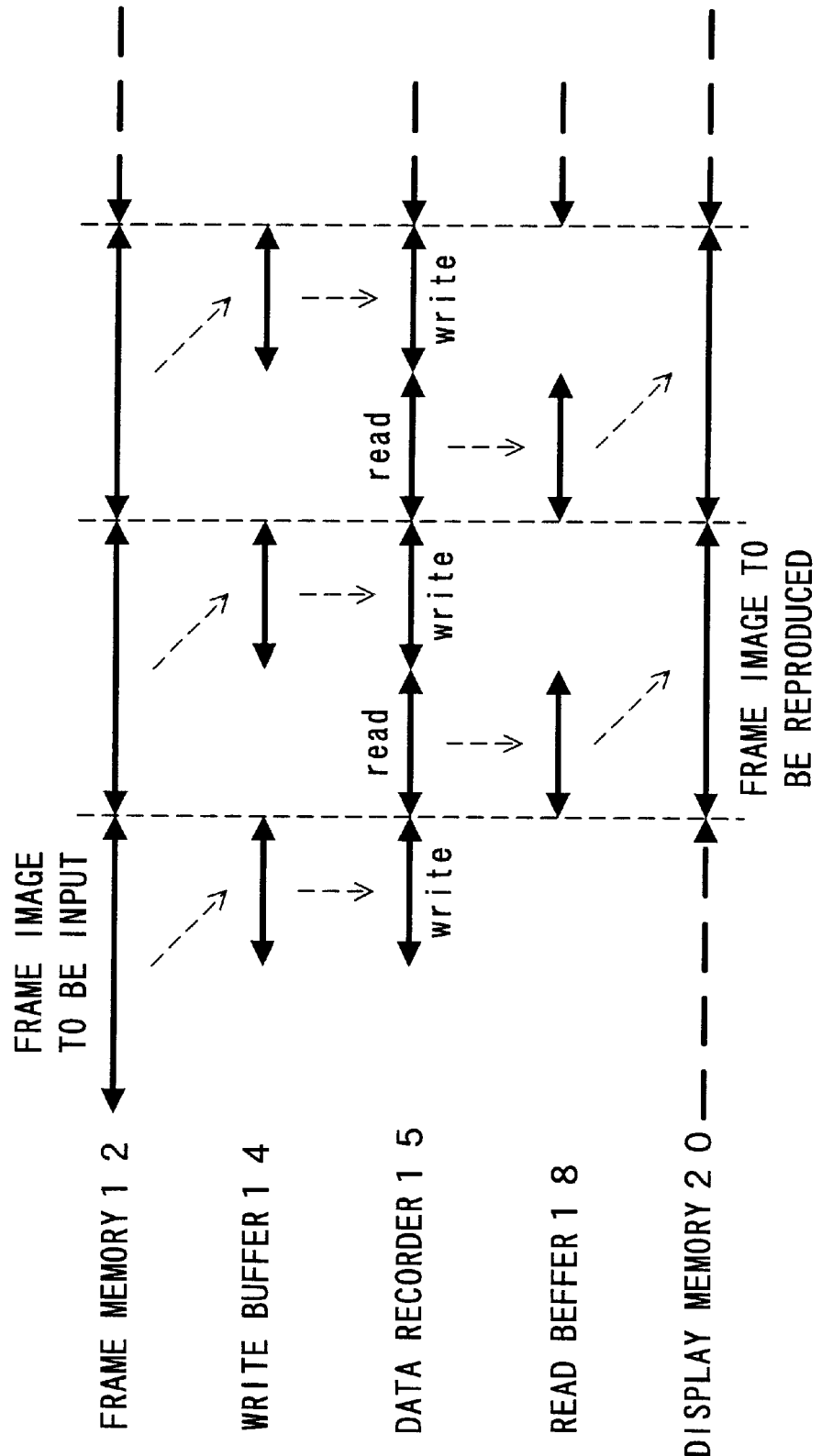
FIG. 11 is a diagram exemplifying data timings of a read and write buffers in a case of concurrent recording and reproducing executed by the data recorder.

The process controller 16 reads out the recorded compressed data corresponding to the obtained entry address via the read buffer 18 (Step S14). As seen from FIG. 11, even if the data recorder 15 is still recording the compressed data, the process controller 16 can simultaneously read out the compressed data to be read.

Referring back to FIG. 9, the process controller 16 controls the data decompressor 19 decompressing the compressed data which is read out by the read buffer 18. The decompressed frame image is then supplied to the display memory 20 (Step S15). In such a case, the process controller 16 stops transferring to the display memory 20 a predetermined frame image to be input which is recorded in the frame memory 12, in this case the frame image of the camera code 02 for example. Instead, the process controller 16 supplies the decompressed frame image to be reproduced in the display memory 20.

The process controller 16 supplies the frame image recorded in the display memory 20 to the display apparatus 5 via the D/A converter 21 and allows the monitor image and the reproduction image to be displayed thereon (Step S16).

The process controller 16 determines whether the compressed data to be reproduced is completed or not (Step S17).

If the process controller 16 determines that the compressed data to be reproduced is not completed yet, the flow goes back to Step S14, and the process is repeated. On the contrary, if the process controller 16 determines that the compressed data to be reproduced is completed, the image data reproduction process is ended.

As described above, in the image reproduction process, the compressed data wherein the frame image to be reproduced is compressed is sequentially reproduced in accordance with the index table which is formed during the image data recording process. The process controller 16 allows the frame image captured by the cameras 2 to be displayed and recorded concurrently. Thus, the image data which is recorded in the past can be easily reproduced while the image data is still being recorded.

Figure 12:
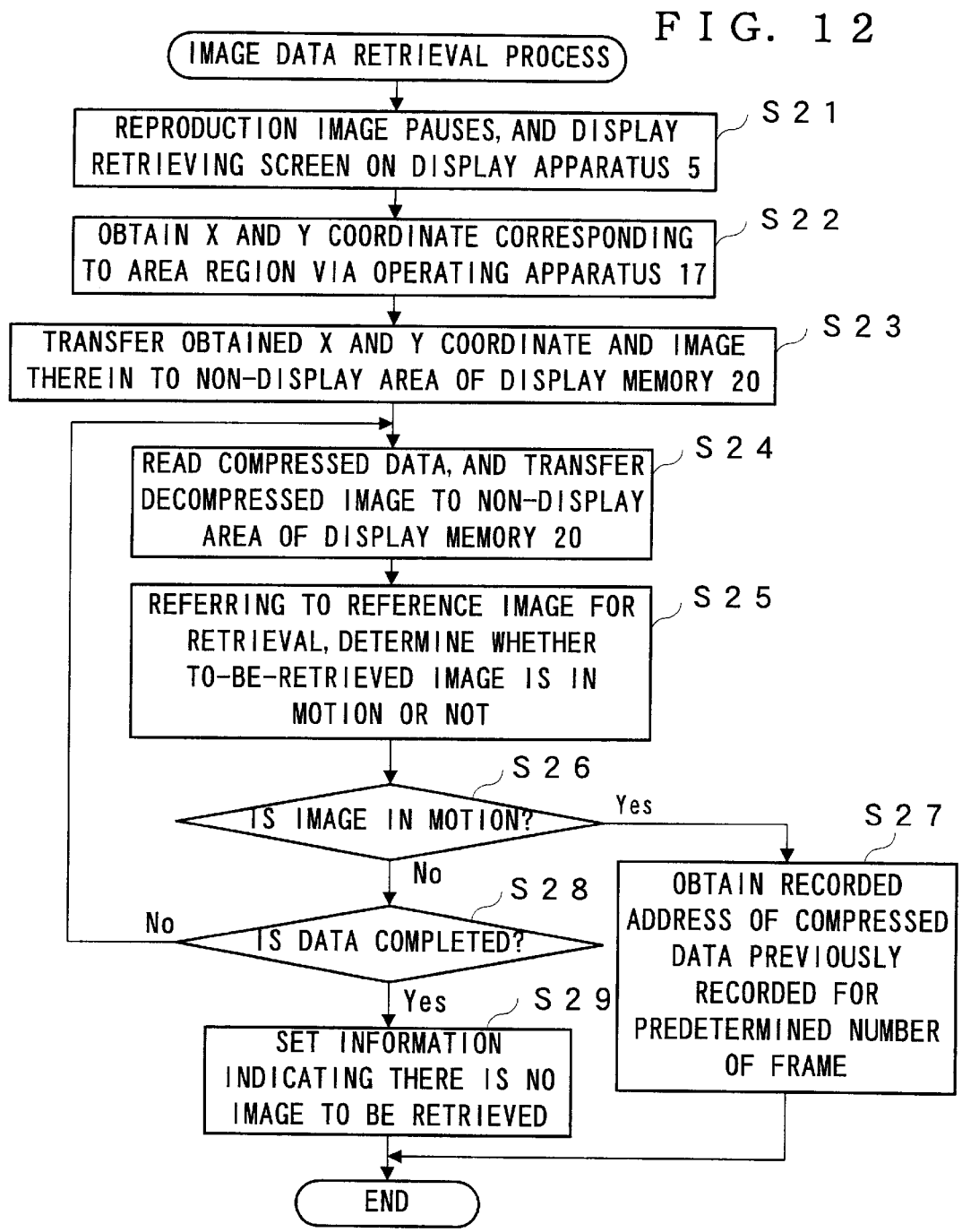
FIG. 12 is a flowchart for explaining an image data retrieval process executed by the monitoring system according to the first embodiment of the present invention.

An image data retrieval process executed by the monitoring system according to the first embodiment of the present invention will now be explained with reference to FIG. 12. FIG. 12 is a flowchart for explaining an image data retrieval process executed by the monitoring system.

While the image data reproduction process is being executed as described in FIG. 9, the process controller 16 recognizes that the user specifies data retrieval by inputting through the operating apparatus 17. In such a case, the process controller 16 makes the image data reproduction process to pause, so that the image data retrieval process and the image data recording process shown in FIG. 12 concurrently start to be executed.

Figure 13A:
FIGS. 13A and 13B are diagrams each exemplifying an image displayed on the display apparatus on which a user specifies an image area.

The process controller 16 allows the reproduction image to pause, and generates screen information for retrieval on which the user specifies an arbitrary area. The process controller 16 allows the generated information to be synthesized with the reproduction image so as to be displayed on the display apparatus 5 (Step S21). As seen from FIG. 13A, the process controller 16 displays on the display screen the pausing reproduction image which is synthesized with a message that the user is required to specify the arbitrary area in the image.

Figure 13B:
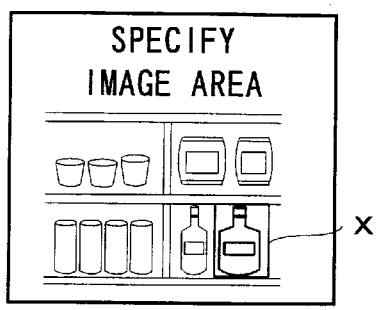

The process controller 16 receives x and y coordinates corresponding to the area specified by the user through the operating apparatus 17 (Step S22). As illustrated in FIG. 13B, the user may specify a rectangular area x where a bottle is included in the pausing image, for example. The process controller 16 thus receives the two x and y coordinates which are diagonal rows corresponding to the rectangular area.

Figure 13C:
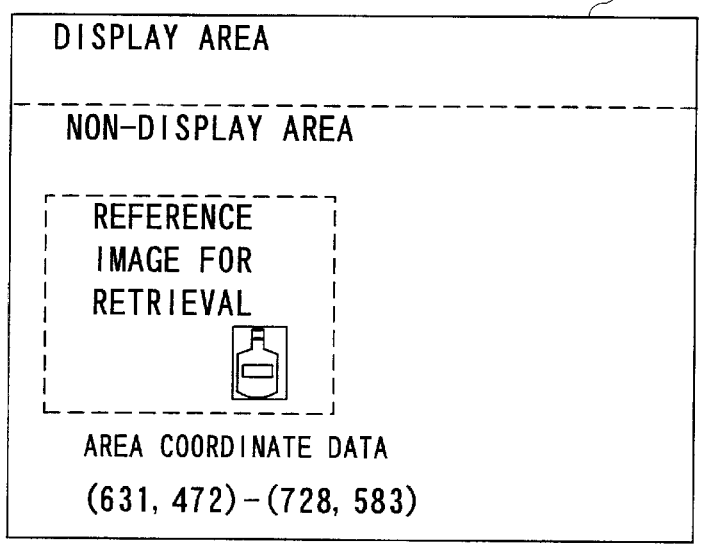
FIGS. 13C and 13D are diagrams each exemplifying a reference image for retrieval and an image to be retrieved both of which are stored in a non-display area of the display memory.

The process controller 16 transfers the received coordinates and the image of the area specified by the user to the non-display area of the display memory 20 (Step S23). As seen from FIG. 13C, the process controller 16 transfers as a reference image for retrieval and as area coordinate data the received coordinates and the image of the specified area respectively to the non-display area in the display memory 20.

Figure 13D:
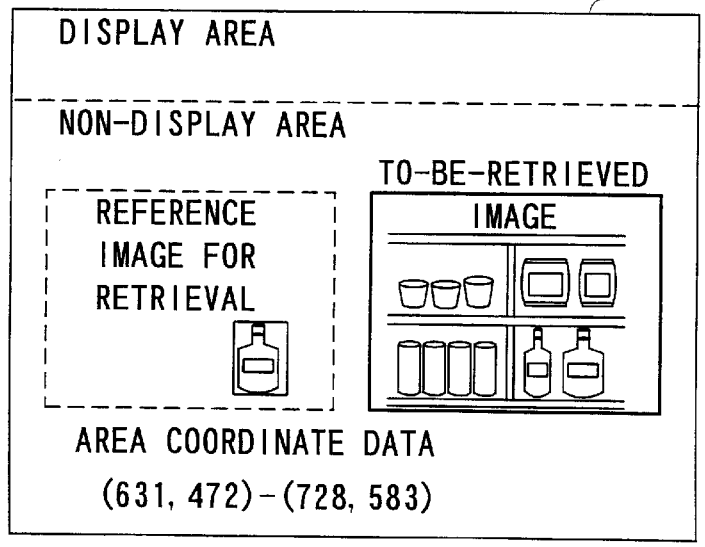

The process controller 16 reads out the following compressed data recorded on the data recorder 15, controls the data decompressor 19 so as to decompress the compressed data temporarily recorded in the read buffer 18, and transfers the decompressed frame image to the non-display area of the display memory 20 (Step S24). That is, as seen from FIG. 13D, the process controller 16 transfers the decompressed frame image to be reproduced to the non-display area of the display memory 20 as an image to be retrieved.

The process controller 16 determines whether an area is in motion or not. The area corresponds to the reference image for retrieval in the image to be retrieved which is transferred in the non-display area of the display memory 20 (Step S25). That is, the process controller 16 obtains a difference between the values of the reference image for retrieval and the area corresponding thereto in the image to be retrieved. If the obtained difference is smaller than a given value, the process controller 16 recognizes that the image is not in motion. On the contrary, if the obtained difference is greater than the given value, the process controller 16 recognizes that the image is in motion.

The process controller 16 determines whether the image to be retrieved is in motion or not (Step S26).

In a case where the process controller 16 determines that the image to be retrieved is in motion, it obtains the recorded address of the compressed data previously recorded for a given number of frames, and ends up the retrieval process (Step S27).

In a case where the process controller 16 determines that the image to be retrieved is not in motion, it also determines whether the compressed data to be retrieved is completed or not (Step S28).

If the process controller 16 determines that the data is not completed, the flow goes back to Step S24 and the process is repeated. On the contrary, if the process controller 16 determines that the data is completed, it sets information indicating that there is not found the image to be retrieved and ends up the retrieval process (Step S29).

The process controller 16 performs back the image data reproduction process. In the case where the process controller 16 sets the information indicating that there is not found the image to be retrieved, it allows the display apparatus 5 to display the message indicating that there is not found the image to be retrieved, as illustrated in FIG. 14A.

Figures 14A, 14B:
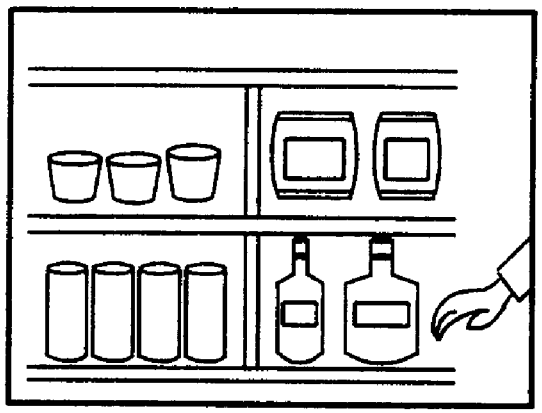
FIG. 14A is a diagram exemplifying an image displayed on the display apparatus in a case where an image in motion is not retrieved in the specified area.

On the contrary, in the case where the process controller 16 obtains the recorded address of the compressed data in Step S27, it restarts the reproduction of the image, beginning from the compressed data with the obtained address, as illustrated in FIG. 14B. Thus, the process controller 16 can accurately retrieve the desired image to be retrieved.

In the first embodiment of the present invention, the process controller 16 determines whether the image is in motion or not in the rectangular area which is specified by the user during the image data retrieval process. In doing this, the process controller 16 retrieves the motion image, however, the user can arbitrarily set the shape and the number of the area which is used for determining the presence of the motion image. For example, the process controller 16 can determine whether the image is in motion or not within plural areas specified by the user, and it may retrieve the image which is in motion within either one of the plural areas.

In the first embodiment of the present invention, the process controller 16 determines the presence of the motion image within the area specified by the user during the image data retrieval process, in terms of the user-specified continuous image, however, it can retrieve the motion image referring from all the images captured at a specified time and/or by the cameras with a specified camera code.

In the first embodiment of the present invention, the user can specify to reproduce and retrieve all those images recorded on the data recorder 15. However, depending on the recording time and the camera code, the only authorized user may specify to reproduce and retrieve the image data. For example, the user can arrange a control table which retains information, such as a pass word or the like, for restricting any specifying act of reproducing and/or retrieving the image which is captured at a particular time recorded on the data recorder 15. Accordingly, unless there is no pass word entered from the operating apparatus 17, the image can not be reproduced and/or retrieved. In addition, the user can lock the image that he/she does not wish other persons to reproduce and see.

In the first embodiment of the present invention, the so-far described monitoring system is a single monitoring system which is arranged at a store or an institution. However, the monitoring system can be equipped with a plurality of monitoring cameras arranged at a plurality of stores or institutions, so that image data which is captured by the plurality of the cameras can be monitored and centralized at a central station via a network. A monitoring system which can remotely and centrally monitor a plurality of places according to the second embodiment of the present invention will now be explained.

FIG. 15 is a diagram exemplifying the structure of the remote monitoring system according to the second embodiment of the present invention. As illustrated in FIG. 15, the remote monitoring system includes a remote control device 100 and a plurality of monitoring devices 300 both of which are connected with each other via a network 200, such as a telecommunication network. Since, the network 200 is arbitrarily selected in terms of its types, it can be a radio network or the Internet.

As illustrated in FIG. 16, the remote control device 100 comprises a communication device 111, a communication buffer 112, a data decompressor 113, a display memory 114, a communication controller 115, a process controller 116, a D/A (digital/analog) converter 117, a display apparatus 118 and an operating apparatus 119.

The communication device 111 includes a modem or the like, and transmits and receives data to and from the monitoring devices 300 via the network 200. The communication device 111 transmits to the monitoring devices 300 a request for transmitting data so as to receive compressed data, such as image data, from the monitoring devices 300. When the communication devices 111 obtains the transmitted compressed data, it supplies the data to the communication buffer 112.

The communication buffer 112 temporarily records the compressed data which is supplied from the communication device 111.

The data decompressor 113 decompresses the compressed data recorded in the communication buffer 112 and supplies the decompressed frame image to the display memory 114.

The display memory 114 records a frame image which is to be displayed on the display apparatus 118. The display memory 114 records the image data which is to be displayed on the display apparatus 118 via the D/A converter 117.

The communication controller 115 controls data communications in the communication device 111 performed with the monitoring devices 300 connected via the network 200.

The process controller 116 includes a CPU (Central Processing Unit) having a ROM (Read Only Memory) and a RAM (Random Access Memory). The process controller 116 controls the entire parts of the remote control device 100.

The process controller 116 controls the communication controller 115 in accordance with user-specified information which is input through the operating apparatus 119 by the user. The process controller 116 sends a request for transmitting the recorded compressed data, such as image data or the like, to a user-specified monitoring device 300. The process controller 116 receives the compressed data from the specified monitoring device 300 via the communication device 111 and allows the communication buffer 112 to record the data. The process controller 116 controls the data decompressor 113 so that the compressed data recorded in the communication buffer 112 can be decompressed. The process controller 116 controls the display memory 114 to sequentially record the decompressed frame image. The process controller 116 supplies the frame image recorded in the display memory 114 to the display apparatus 118 via the D/A converter 117, and the monitor image can be displayed thereon. That is, the process controller 116 controls the display apparatus 118 thereof to reproduce and display the image recorded in the monitoring devices 300.

The D/A (digital/analog) converter 117 converts the frame image recorded in the display memory 114 to an analog signal, such as a picture signal or the like, and sequentially supplies the converted signal to the display apparatus 118.

The display apparatus 118 displays the frame image supplied from the display memory 114 via the D/A converter 117.

The operating apparatus 119 includes an input device, such as a keyboard or a mouse, and supplies the user-specified information to the process controller 116.

As shown in FIG. 17, each of the monitoring devices 300 includes cameras 121, a microphone 122, a sensor 123, an A/D (analog/digital) converter 124, a frame memory 125, a data compressor 126, a write buffer 127, a data recorder 128, a process controller 129, a read buffer 130, a communication device 131, a communication controller 132, a display memory 133, a D/A converter 134 and a display apparatus 135.

The cameras 121 are a plurality of imaging cameras of, for example, four CCD cameras each of which is arranged in a given position, inside and/or outside of a store or an institution. Each of the cameras 121 captures an image within a predetermined range centering from its arranged position. The cameras 121 generate a picture signal so as to sequentially supply the signal to the frame memory 125 via the A/D converter 124. A camera code, any one of 01 to 04, is pre-given to each of the cameras 2. The frame image captured by the respective cameras 121 each having the camera code is recorded in a predetermined area of the frame memory 125.

The microphone 122 can be arranged at a peripheral section of any one of the cameras 121 or can be incorporated with any one of the cameras 121. The microphone 122 receives voice data from its own arranged position. The microphone 122 allows the received voice signal to be recorded in a predetermined area of the frame memory 125 via the A/D converter 124. A plurality of the microphones 122 can be arranged so as to obtain the voice signal from each of the positions.

The sensor 123 can be a shock sensor, an infrared sensor, or a temperature sensor. When the sensor 123 detects an undesired value which exceeds a preset value, it generates an alarm signal and supplies the generated signal to the process controller 129 via the A/D converter 124.

The A/D converter 124 converts into a digital signal an analog signal, such as a picture signal or a voice signal which is input from the cameras 121, the microphone 122 and the sensor 123. The AND converter 124 then sequentially supplies the converted signal to the frame memory 125 and to the process controller 129.

The frame memory 125 temporarily records a frame image to be input which is input from the cameras 121 via the A/D converter 124 and a frame image for reference used for determining whether an image is in motion or not, which will be described later. The frame memory 125 is composed of four frame image areas to be input and four frame image areas for reference, for example. The number of the frame image areas corresponds to the number of the arranged cameras. A camera code is pre-given to the respective cameras 2 each of which captures a frame image to be input. In each of the frame image areas, the captured frame image to be input is recorded.

The frame memory 125 records the voice data which is input from the microphone 122 via the AND converter 124. The frame memory 125 at once records the voice data corresponding to a predetermined period of time to coincide with a timing at which the frame image to be input is obtained from one of the cameras 121 via the A/D converter 124.

Of the frame images recorded in the frame memory 125, the frame image to be input which is determined as being in motion is compressed by the data compressor 126. The data compressor 126 then supplies the compressed data to the write buffer 127. In a case where a frame image which is determined as being in motion is one obtained from the camera 121 with the microphone 122, the data compressor 126 compresses the frame image to be input and obtained voice data. The data compressor 126 supplies the compressed data to the write buffer 127.

The write buffer 127 temporarily records the compressed data which is supplied from the data compressor 126 and which is to be recorded on the data recorder 128.

The data recorder 128 can be a magnetic disk (hard disk) having a given storage capacity. The data recorder 128 records the compressed data which is supplied from the data compressor 126 via the write buffer 127. The data recorder 128 supplies the recorded compressed data to the communication device 131 via the read buffer 130. Since the data recorder 128 allows the compressed data or the like to be input and output via the write buffer 127 and the read buffer 130, it is capable of concurrently writing and reading data. In the second embodiment of the present invention as well as in the first embodiment, information recorded on the data recorder 128 includes the index table illustrated in FIG. 3A and the actual data shown in FIG. 3B.

The process controller 129 comprises a CPU having a peripheral device of, for example, a date/time generator, and controls the entire monitoring device 300.

The process controller 129 sequentially transfers to the display memory 133 each of the frame images to be input which is recorded in the frame memory 125 and which is transmitted from the cameras 121 via the A/D converter 124. The process controller 129 supplies the transferred image to the display apparatus 135 via the D/A converter 134 so as a monitor image to be displayed on the display apparatus. That is, the process controller 129 allows the image captured by the respective cameras 121 to be displayed in real time.

The process controller 129 compares the frame image to be input which is input from the cameras 121 via the N/D converter 124 and the frame image for reference which is stored in the frame memory 125. The process controller 129 then determines whether the frame image to be input is in motion or not. That is, the process controller 129 obtains a difference between the value of the frame image to be input and the frame image for reference. The process controller 16 determines the image in motion if the obtained difference indicates a greater value than a given value. In a case where the image is in motion, the process controller 129 controls the data compressor 126 and compresses the image data or the like. The compressed data is then recorded on the data recorder 128 via the write the buffer 127. When the compressed data is recorded on the data recorder 128, in the second embodiment as well, the process controller 129 form the index table shown in FIG. 3A by means of the control table, shown in FIG. 4, which is stored in the RAM which is a peripheral device (not shown).

The user specifies that the compressed data, such as the frame image, recorded on the data recorder 128 is to be transmitted from the remote control device 100 via the communication controller 132. In such a case, the process controller 129 sequentially reads out to-be-read compressed data from the data recorder 128 via the read buffer 130. The process controller 129 controls the communication controller 132 so as to supply the read compressed data to the remote control device 100 via the communication device 131. In other words, the process controller 129 sequentially supplies the compressed data recorded on the data recorder 128 to the remote control device 100 via the network 200.

The read buffer 130 temporarily records the compressed data, such as the frame image or the like, which is read out from the data recorder 128.

The communication device 131 includes a modem or the like so that it can transmit and receive data from and to the remote control device 100 via the network 200. The communication controller 132 controls the communication device 131 which transmits the compressed data, such as the image data, recorded in the read buffer 130 to the remote control device 100 via the network 200.

The communication controller 132 controls the data communications performed between the communication device 131 and the remote control device 100 via the network 200.

When the image captured by the cameras 121 is displayed in real time, the display memory 133 sequentially records four frame images to be input which are transmitted from the frame memory 125 by the process controller 129.

The D/A (digital/analog) converter 134 converts into an analog signal, such as a picture signal or the like, the frame image recorded in the display memory 133. The D/A converter 134 then sequentially supplies the converted signal to the display apparatus 135.

The display apparatus 135 displays the frame image which is supplied from the display memory 133 via the D/A converter 134. In the case where the image captured by the cameras 121 is displayed in real time, the display apparatus 135 sequentially displays the image in the form of a screen split into four divisions, that is, four frame images, recorded in a display area of the display memory 133.

An image data recording process executed by the remote monitoring system according to the second embodiment of the present invention will now explained with reference to FIG. 18. FIG. 18 is a flowchart for explaining the image data recording process executed by the monitoring devices 300 of the remote monitoring system. When the process controller 129 of the respective monitoring devices 300 recognizes that the user specifies the data to be recorded from the remote control device 100 via the communication controller 132, the image data recording process can be executed.

The process controller 129 allows the frame image which is supplied from the cameras 121 via the AND converter 124 to be recorded in the frame memory 125 (Step S101).

The process controller 129 transfers the frame image to be input which is recorded in the frame memory 125 to the display memory 133 (Step S102).

The process controller 129 allows the frame image recorded in the display memory 133 to be displayed on the display apparatus 135 (Step S103). The process controller 129 then allows a monitor image captured by the cameras 121 to be displayed on the display apparatus 135 in real time.

The process controller 129 determines whether the frame image to be input which is recorded in the frame memory 125 is in motion or not (Step S104). That is, the process controller 129 obtains a difference between the values of the frame image for reference and the frame image to be input. The process controller 129 then determines that the image is not in motion, if the obtained difference indicates a smaller value than a given value. On the contrary, the process controller 129 determines that the image is in motion, if the obtained difference indicates a greater value than the given value.

The process controller 129 determines whether the frame image to be input is in motion or not (Step S105).

If the process controller 129 determines that the frame image to be input is not in motion, the flow goes to Step S109.

On the contrary, if the process controller 129 determines that the frame image to be input is in motion, it controls the data compressor 126 which compresses the frame image to be input (Step S106). The process controller 129 adds a header to the compressed data.

The process controller 129 allows the data recorder 128 to record the compressed data with the header via the write buffer 127 (Step S107).

The process controller 129 transfers the frame image to be input to a corresponding frame image area for reference (Step S108).

The process controller 129 updates the control table recorded in the RAM which is the peripheral device (Step S109). It should be noted that the process of updating the control table executed by the process controller 129 is the same as the process of Step S9 described in FIG. 7 in the first embodiment of the present invention.

The process controller 129 determines whether the user specifies to stop the recording, by inputting through the remote control device 100 via the communication controller 132 (Step S110). In a case where the process controller 129 determines that the user does not specify to stop the recording, the flow goes back to Step S101 and the process is repeated. On the contrary, in a case where the process controller 129 determines that the user specifies to stop the recording, it ends up the image data recording process.

As explained above, in the image data recording process, if the process controller 129 determines that the frame image is in motion, it allows the compressed data, such as the frame image or the like, to be recorded on the data recorder 128. In such a case, the process controller 129 controls the state of recording by updating the control table. In a case where continuous recording has been stopped, the process controller 129 forms the index table based on the control table so as to record the formed table on the data recorder 128. As a result, in the case where the image data is stopped to be continuously recorded, the process controller 129 forms the index table, so that the user can immediately retrieve the already-recorded compressed data.

An image data reproduction process executed by the remote monitoring system according to the second embodiment of the present invention will now be explained with reference to FIGS. 19A and 19B. FIG. 19A is a flowchart for explaining a remote reproduction process executed by the remote control device 100 of the remote monitoring system of the present invention. FIG. 19B is a flowchart for explaining an image data transmission process executed by the monitoring devices 300 of the remote control system of the present invention. While the monitoring devices 300 execute the image data transmission process shown in FIG. 19B and the image data recording process shown in FIG. 18 simultaneously, the monitoring system can concurrently record and reproduce the compressed data or the like.

If the process controller 116 of the remote control device 100 recognizes that the user specifies remote reproduction via the operational apparatus 119, the process controller 116 starts the remote reproduction process described in FIG. 19B. On the other hand, once the process controller 129 of the respective monitoring devices 300 recognizes that the user specifies reproduction from the remote control devices 100 via the communication controller 132, while the image data recording process illustrated in FIG. 18 is still in operation, it concurrently starts the image data transmission process shown in FIG. 19B and the image data recording process shown in FIG. 18.

The process controller 116 of the remote control device 100 transmits information for requesting index information of the already-recorded compressed data to one of the monitoring devices 300 (Step S111). The information for requesting the index information is specified by the user via the operating apparatus 119. The process controller 116 controls the communication controller 115, so that it can transmit the information for requesting the index to the user-specified monitoring device 300 via the communication device 111.

The process controller 129 of the respective monitoring devices 300 receives the information for requesting the index which information is transmitted from the remote control device 100 (Step S121). That is, the process controller 129 controls the communication controller 132 so as to receive the information for requesting the index which information is transmitted from the remote control device 100 via the communication device 131.

The process controller 129 generates information for constituting an index screen, shown in FIG. 20, based on the index table recorded on the data recorder 128 (Step S122).

The process controller 129 transmits the generated information for the index screen to the remote control device 100 (Step S123).

The process controller 116 receives the information for the index screen which information is transmitted from the monitoring device 300 (Step S112), and allows the index screen to be displayed on the display apparatus 118 shown in FIG. 20 (Step S113).

The user selects a number representing which one of the already-captured images is to be reproduced. The process controller 116 obtains this user-selected number via the operating apparatus 119 and transmits the selected number to the monitoring devices 300 (Step S114).

Once the process controller 129 receives the user-selected number which is transmitted from the remote control device 100, it reads out from the data recorder 128 the index table corresponding to the selected number.

The process controller 129 then obtains an entry address of the compressed data which is set in the index table (Step S124).

The process controller 129 reads out the compressed data corresponding to the entry address via the read buffer 130 (Step S125).

Even if the data recorder 128 is in the process of recording the compressed data as shown in FIG. 21, the process controller 129 simultaneously reads out the compressed data.

Referring back to FIG. 19B, the process controller 129 controls the communication controller 132 so as to transmit to the remote control device 100 the compressed data which is temporarily recorded in the read buffer 130 (Step S126).

The process controller 116 receives the compressed data transmitted from the monitoring devices 300 so as the data to be temporarily recorded in the communication buffer 112 (Step S115). That is, the process controller 116 controls the communication controller 115 so as the compressed data which is received via the communication device 111 to be sequentially recorded in the communication buffer 112.

The process controller 116 controls the data decompressor 113 so as to decompress the compressed data recorded in the communication buffer 112. The process controller 116 then supplies the decompressed frame image to the display memory 114 (Step S116).

The process controller 116 supplies the frame image recorded in the display memory 114 to the display apparatus 118 via the D/A converter 117, and allows the monitor image to the displayed on the display apparatus (Step S117).

The process controller 129 determines whether the compressed data to be reproduced which is recorded on the data recorder 128 is completed or not (Step S127).

If the process controller 129 determines that the compressed data is not completed yet, the flow goes back to Step S125, and the process is repeated. On the contrary, if the process controller 129 determines that the compressed data is completed, it ends up the image data transmission process.

The process controller 116 determines whether the compressed data which is transmitted from the monitoring devices 300 is completed or not (Step S118).

If the process controller 116 determines that the compressed data is not completed yet, the flow goes back to Step S115 and the process is repeated. On the contrary, if the process controller 116 determines that the compressed data is completed, it ends up the remote reproduction process.

As explained above, in the image data reproduction process, the user specifies the compressed data wherein the frame image is compressed, in accordance with the information for the index screen which the remote control device 100 obtains from the monitoring devices 300. The remote control device 100 receives the compressed data from the monitoring devices 300 and sequentially reproduces the received data while decompressing the compressed data. In such a case, the process controller allows the frame image captured by the cameras 121 of the respective monitoring devices 300 to be displayed and concurrently recorded. In doing this, the image data executed by the monitoring devices 300 can be recorded without any stoppage, and the user can obtain a desired image from the monitoring devices 300 connected via the network.

According to the second embodiment of the present invention, in the remote control device 100, the compressed data transmitted from the monitoring devices 300 is decompressed so that the only image reproduction process is executed thereby. However, a data recorder recording the compressed data can be further arranged, and the compressed data transmitted from the monitoring devices 300 can be recorded in the remote control device 100. Further, the data recorder can concurrently record and reproduce the data.

According to the second embodiment of the present invention, the process controller 116 in the remote control device 100 receives the compressed data from the monitoring devices 300 while the remote reproduction is still in operation, so that the user can specify which compressed data is to be reproduced. However, every time the process controller 129 in the monitoring devices 300 updates the index table recorded on the data recorder 128, the remote control device 100 can receive the information for the index screen from the monitoring devices 300 and records the received information in the RAM which is the peripheral device of the process controller 116. Thus, the user can always retrieve the most recently recorded data from the monitoring devices 300, and can specify a desired image recorded in the monitoring devices 300.

The monitoring system of the present invention can be realized by employing an ordinary computer system instead of an exclusive computer system. The monitoring system executing the above-described processes can be realized by installing a program for executing the above processes from a recording medium, such as a floppy disk, a CD-ROM or the like, which stores the program.

The medium for supplying the program to the computer can be a communication medium (such as a communication circuit, a communication network, a communication system all of which temporarily retains the program).

The above processes can be executed under the control of the OS when the program runs and is executed as other application programs do.

The codes constituting the program may be embedded in a carrier wave.

For example, the program can be uploaded on the Bulletin Board Systems (BBS) of a communication network so that the program (program codes) can be embedded in the carrier wave of the network and transmitted via the network.

What is claimed is:

1. A digital recorder comprising:
   an image input device which inputs a monitor image captured by a camera arranged in a predetermined position;
   a recorder which records said monitor image input by said image input device;
   a reading device which sequentially reads out the monitor image recorded by said recorder;
   an area specifying device which specifies at least an area of the monitor image read out by said reading device;
   a retrieving device which retrieves a monitor image which is in motion in the image area specified by said area specifying device, referring from the monitor image sequentially read out by said reading device; and
   an image output device which outputs the monitor image retrieved by said retrieving device.

2. The digital recorder according to claim 1, wherein said area specifying device specifies as a reference image an image within an area of the monitor image read out by said reading device; and
   said retrieving device retrieves a monitor image indicating a difference, which is greater than a given set value, between values of said reference image specified by said area specifying device and the image substantially within same area as said reference image in the monitor image read out by said reading device.

3. The digital recorder according to claim 1, wherein said recorder records a frame image which is input by said image input device at predetermined intervals;
   said reading device sequentially reads out said frame image which is recorded on said recorder;
   said area specifying device specifies at least an area of said frame image read out by said reading device;
   said retrieving device retrieves a frame image which is in motion within the area specified by the area specifying device, referring from said frame image sequentially read out by said reading device; and
   said image input device outputs the frame image retrieved by said retrieving device, including from a frame image which is previously recorded for a given number of frames.

4. A digital recorder comprising;
   a camera which captures a monitor image and which is arranged in a predetermined position;
   a data recorder which records said monitor image captured by said camera;
   a read buffer which sequentially reads out said monitor image recorded on said data recorder;
   an operating apparatus which specifies at least an area within said monitor image read out by said reading buffer;
   a process controller which retrieves a monitor image which is in motion within the area specified by said operating apparatus, referring from said monitor image sequentially read out by said read buffer; and
   a display apparatus which displays said monitor image retrieved by said process controller.

5. A monitoring system comprising:
   a recorder which records a monitor image captured by a camera arranged in a predetermined position;
   a reading device which sequentially reads out said monitor image recorded on said recorder;
   an area specifying device which specifies at least an area within said monitor image read out by said reading device;
   a retrieving device which retrieves a monitor image which is in motion within said area specified by said area specifying device, referring from said monitor image sequentially read out by said reading device; and
   a reproduction device which reproduces said monitor image retrieved by said retrieving device.

6. The monitoring system according to claim 5, wherein said area specifying device specifies a reference image in the area of said monitor image read out by said reading device; and
   said retrieving device retrieves a monitor image indicating a difference, which is greater than a given set value, between values of the reference image specified by said area specifying device and said image substantially within same area as the reference image in said monitor image which is read by said reading device.

7. The monitoring system according to claim 5, wherein the recorder records the frame image which is captured at predetermined intervals by said camera arranged in said predetermined position;
   said reading device sequentially reads out said frame image recorded on said recorder;
   said area specifying device specifies at least one area in said frame image which is read out by said reading device;
   said retrieving device retrieves said frame image which is in motion within the area specified by said area specifying device, referring from said frame image sequentially read out by said reading device; and said reproduction device reproduces said frame image retrieved by said retrieving device, including from a preceding frame image which is previously recorded for a given number of frames.

8. A monitoring system comprising:

a data recorder which records a monitor image which is captured by a camera arranged in a predetermined position;

a read buffer which sequentially reads out said monitor image recorded on said data recorder;

an operating apparatus which specifies at least an area in said monitor image read out by said read buffer;

a process controller which retrieves a monitor image which is in motion in the area specified by said operating apparatus, referring from said monitor image sequentially read out said read buffer; and a display apparatus which displays said monitor image retrieved by said process controller.

9. A monitor image retrieval method comprising:

a recording step of recording a monitor image captured by a camera arranged in a predetermined position;

a reading step of sequentially reading out said monitor image recorded in said recording step;

an area specifying step of specifying at least an area of said monitor image read out in said reading step;

a retrieving step of retrieving a monitor image which is in motion in said area specified in said area specifying step referring from said monitor image sequentially read out by said reading step; and a reproducing step of reproducing said monitor image retrieved in said retrieving step.

10. A recording medium which is a computer readable medium recording a program for executing a computer as a monitoring system, said medium recording said program for executing a recording step of recording a monitor image which is captured by a camera arranged in a predetermined position;

a reading step of sequentially reading out said monitor image recorded in said recording step;

an area specifying step of specifying at least an area of said monitor image recorded in said reading step;

a retrieving step of retrieving a monitor image which is in motion in the area specified in said area specifying step, referring from said monitor image sequentially read out by said reading step; and a reproducing step of specifying said monitor image retrieved in said retrieving step.

11. A computer data signal embedded in a carrier wave and representing a instruction sequence for executing a computer as a monitoring system, said computer data signal allowing the computer to execute:

a recording step of recording a monitor image which is captured by a camera arranged in a predetermined position;

a reading step of sequentially reading out said monitor image recorded in said recording step;

an area specifying step of specifying at least an area in said monitor image which is read out in said reading step;

a retrieving step of retrieving a monitor image which is in motion within the area specified in the area specifying step, referring from said monitor image sequentially read out by said reading step; and a reproducing step of reproducing said monitor image retrieved in said retrieving step.

* * * * *